US008611334B2

(12) United States Patent  (10) Patent No.: US 8,611,334 B2
Naqvi  (45) Date of Patent: Dec. 17, 2013

(54) SYSTEMS AND METHODS FOR PRESENTING MULTIMEDIA OBJECTS IN CONJUNCTION WITH VOICE CALLS FROM A CIRCUIT-SWITCHED NETWORK

(75) Inventor: Shamim A. Naqvi, Boston, MA (US)

(73) Assignee: Aylus Networks, Inc., Westford, MA (US)

( * ) Notice: Subject to any disclaimer, the term of this patent is extended or adjusted under 35 U.S.C. 154(b) by 834 days.

(21) Appl. No.: 12/050,765

(22) Filed: Mar. 18, 2008

(65) Prior Publication Data

US 2008/0259887 A1  Oct. 23, 2008

Related U.S. Application Data

(63) Continuation-in-part of application No. 11/504,896, filed on Aug. 16, 2006, which is a continuation-in-part of application No. 11/709,469, filed on Feb. 22, 2007.

(60) Provisional application No. 60/800,688, filed on May 16, 2006, provisional application No. 60/809,029, filed on May 26, 2006, provisional application No. 60/918,863, filed on Mar. 19, 2007.

(51) Int. Cl.
H04L 12/28 (2006.01)

(52) U.S. Cl.
USPC ........... 370/351; 370/352; 370/355; 370/356; 455/455

(58) Field of Classification Search
None
See application file for complete search history.

(56) References Cited

U.S. PATENT DOCUMENTS

| 4,736,407 | A | 4/1988 | Dumas |
| 4,925,311 | A | 5/1990 | Neches et al. |
| 6,014,706 | A | 1/2000 | Cannon et al. |
| 6,018,662 | A | 1/2000 | Periyalwar et al. |
| 6,032,053 | A | 2/2000 | Schroeder et al. |
| 6,047,194 | A | 4/2000 | Andersson |
| 6,061,572 | A | 5/2000 | Laiho |
| 6,067,529 | A | 5/2000 | Ray et al. |
| 6,374,112 | B1 | 4/2002 | Widegren et al. |
| 6,574,326 | B1 | 6/2003 | Wong et al. |

(Continued)

FOREIGN PATENT DOCUMENTS

| EP | 1435748 | 7/2004 |
| EP | 1545129 A1 | 6/2005 |

(Continued)

OTHER PUBLICATIONS

International Search Report for International Application No. PCT/US07/04854, Aylus Networks, Inc., Jan. 31, 2008 (3 pages).

(Continued)

*Primary Examiner* — Rafael Pérez-Gutiérrez
*Assistant Examiner* — Daniel Nobile
(74) *Attorney, Agent, or Firm* — Stuart H. Mayer; Mayer & Williams PC

(57) ABSTRACT

The present invention provides systems and methods for presenting a multimedia object to a handset in conjunction with voice call from a circuit switched (CS) network. The voice call is delivered over the CS network and the multimedia object is delivered over a packet-switched (PS) network. The multimedia object can be rendered as a voice call alert, during the voice call, or after the voice call. The multimedia object can be an advertisement object and can be provided by a third party. The systems and methods described are applicable to IMS and non-IMS networks.

29 Claims, 10 Drawing Sheets

(56) References Cited

U.S. PATENT DOCUMENTS

| | | |
|---|---|---|
| 6,608,832 B2 | 8/2003 | Forslow |
| 6,650,705 B1 | 11/2003 | Vetro et al. |
| 6,675,196 B1 | 1/2004 | Kronz |
| 6,694,145 B2 | 2/2004 | Riikonen et al. |
| 6,782,412 B2 | 8/2004 | Brophy et al. |
| 6,857,021 B1 | 2/2005 | Schuster et al. |
| 6,888,828 B1 | 5/2005 | Partanen et al. |
| 6,950,655 B2 | 9/2005 | Hunkeler et al. |
| 7,024,198 B2 | 4/2006 | Knaebchen et al. |
| 7,076,554 B1 | 7/2006 | Kobayashi |
| 7,299,049 B2 | 11/2007 | Jagadeesan |
| 7,301,938 B2 | 11/2007 | Ejzak |
| 7,353,021 B2 | 4/2008 | Ejzak et al. |
| 7,519,075 B2 | 4/2009 | Tu |
| 7,640,038 B2 | 12/2009 | Reddy |
| 7,729,298 B2 | 6/2010 | Velagaleti et al. |
| 7,856,226 B2 | 12/2010 | Wong et al. |
| 8,065,402 B2 | 11/2011 | Chen et al. |
| 8,170,534 B2 | 5/2012 | Naqvi et al. |
| 2002/0059416 A1 | 5/2002 | Tuunanen |
| 2002/0064274 A1* | 5/2002 | Tuunanen et al. ....... 379/221.08 |
| 2002/0140726 A1 | 10/2002 | Schwartz et al. |
| 2002/0181462 A1 | 12/2002 | Surdila et al. |
| 2003/0026245 A1 | 2/2003 | Ejzak |
| 2003/0027569 A1 | 2/2003 | Ejzak |
| 2003/0027595 A1 | 2/2003 | Ejzak |
| 2003/0055974 A1 | 3/2003 | Brophy et al. |
| 2003/0134636 A1 | 7/2003 | Sundar et al. |
| 2003/0134640 A1 | 7/2003 | Kim et al. |
| 2003/0144008 A1 | 7/2003 | Rehkopf |
| 2003/0193426 A1 | 10/2003 | Vidal |
| 2003/0210683 A1 | 11/2003 | Bais et al. |
| 2004/0008669 A1 | 1/2004 | Bos et al. |
| 2004/0019539 A1 | 1/2004 | Raman et al. |
| 2004/0019901 A1 | 1/2004 | Spio |
| 2004/0043766 A1 | 3/2004 | Sashihara |
| 2004/0043776 A1 | 3/2004 | Tuomela et al. |
| 2004/0048612 A1 | 3/2004 | Virtanen et al. |
| 2004/0062230 A1 | 4/2004 | Taylor et al. |
| 2004/0068574 A1 | 4/2004 | Costa Requena et al. |
| 2004/0076145 A1 | 4/2004 | Kauhanen et al. |
| 2004/0083195 A1 | 4/2004 | McCord et al. |
| 2004/0107143 A1 | 6/2004 | Niemi |
| 2004/0127251 A1* | 7/2004 | Thakkar et al. ............ 455/552.1 |
| 2004/0162892 A1 | 8/2004 | Hsu |
| 2004/0190498 A1 | 9/2004 | Kallio et al. |
| 2004/0193700 A1 | 9/2004 | Westman et al. |
| 2004/0193725 A1 | 9/2004 | Costa-Requena et al. |
| 2004/0205212 A1 | 10/2004 | Huotari et al. |
| 2004/0218571 A1 | 11/2004 | Pascazi |
| 2004/0219912 A1 | 11/2004 | Johansson et al. |
| 2004/0240430 A1 | 12/2004 | Lin et al. |
| 2004/0249887 A1 | 12/2004 | Garcia-Martin et al. |
| 2004/0249962 A1 | 12/2004 | Lecomte |
| 2004/0252673 A1 | 12/2004 | Ejzak et al. |
| 2004/0261116 A1 | 12/2004 | Mckeown et al. |
| 2005/0021494 A1 | 1/2005 | Wilkinson |
| 2005/0025047 A1 | 2/2005 | Bodin et al. |
| 2005/0025163 A1 | 2/2005 | Christie |
| 2005/0043020 A1 | 2/2005 | Lipsanen et al. |
| 2005/0047399 A1 | 3/2005 | Lee et al. |
| 2005/0050194 A1 | 3/2005 | Honeisen et al. |
| 2005/0058125 A1 | 3/2005 | Mutikainen et al. |
| 2005/0083909 A1 | 4/2005 | Kuusinen et al. |
| 2005/0089020 A1 | 4/2005 | Ahlback et al. |
| 2005/0136926 A1 | 6/2005 | Tammi et al. |
| 2005/0141484 A1 | 6/2005 | Rasanen |
| 2005/0170861 A1 | 8/2005 | Niemi et al. |
| 2005/0180394 A1 | 8/2005 | Kautz et al. |
| 2005/0190772 A1 | 9/2005 | Tsai et al. |
| 2005/0213606 A1 | 9/2005 | Huang et al. |
| 2005/0227681 A1 | 10/2005 | Li |
| 2005/0237933 A1 | 10/2005 | Marjelund et al. |
| 2005/0243870 A1 | 11/2005 | Balogh et al. |
| 2005/0245261 A1 | 11/2005 | Ejzak |
| 2005/0271011 A1 | 12/2005 | Alemany et al. |
| 2005/0286531 A1 | 12/2005 | Tuohino et al. |
| 2006/0015812 A1 | 1/2006 | Cunningham et al. |
| 2006/0025151 A1 | 2/2006 | Karaoguz et al. |
| 2006/0031888 A1 | 2/2006 | Sparrell |
| 2006/0062206 A1 | 3/2006 | Krishnaswamy |
| 2006/0083199 A1 | 4/2006 | Yang |
| 2006/0089143 A1 | 4/2006 | Jagadeesan |
| 2006/0104262 A1 | 5/2006 | Kant et al. |
| 2006/0114987 A1 | 6/2006 | Roman |
| 2006/0120287 A1 | 6/2006 | Foti et al. |
| 2006/0120339 A1* | 6/2006 | Akiyama et al. ............. 370/338 |
| 2006/0121902 A1 | 6/2006 | Jagadeesan et al. |
| 2006/0126562 A1 | 6/2006 | Liu |
| 2006/0136557 A1 | 6/2006 | Schaedler et al. |
| 2006/0140150 A1 | 6/2006 | Olvera-Hernandez et al. |
| 2006/0155814 A1 | 7/2006 | Bennett et al. |
| 2006/0161512 A1 | 7/2006 | Schaedler et al. |
| 2006/0164550 A1 | 7/2006 | Yoshimoto et al. |
| 2006/0165050 A1* | 7/2006 | Erhart et al. ................. 370/351 |
| 2006/0183478 A1 | 8/2006 | Jagadeesan et al. |
| 2006/0209768 A1 | 9/2006 | Yan et al. |
| 2006/0221903 A1 | 10/2006 | Kauranen et al. |
| 2006/0246903 A1 | 11/2006 | Kong et al. |
| 2006/0256751 A1 | 11/2006 | Jagadeesan et al. |
| 2006/0258394 A1 | 11/2006 | Dhillon et al. |
| 2006/0262806 A1 | 11/2006 | Bouazizi |
| 2006/0276179 A1 | 12/2006 | Ghaffari et al. |
| 2006/0291412 A1 | 12/2006 | Naqvi et al. |
| 2006/0291419 A1 | 12/2006 | McConnell et al. |
| 2006/0291437 A1 | 12/2006 | Naqvi et al. |
| 2006/0291484 A1 | 12/2006 | Naqvi et al. |
| 2006/0291487 A1 | 12/2006 | Naqvi et al. |
| 2006/0291488 A1 | 12/2006 | Naqvi et al. |
| 2006/0291489 A1 | 12/2006 | Naqvi et al. |
| 2006/0294244 A1 | 12/2006 | Naqvi et al. |
| 2007/0008913 A1 | 1/2007 | Naqvi et al. |
| 2007/0008951 A1 | 1/2007 | Naqvi et al. |
| 2007/0014281 A1 | 1/2007 | Kant |
| 2007/0033286 A1 | 2/2007 | Min |
| 2007/0053343 A1 | 3/2007 | Suotula et al. |
| 2007/0066347 A1 | 3/2007 | Silverbrook et al. |
| 2007/0067807 A1 | 3/2007 | O'Neil |
| 2007/0091855 A1 | 4/2007 | Karaoguz et al. |
| 2007/0110043 A1 | 5/2007 | Girard |
| 2007/0111752 A1 | 5/2007 | Pazhyannur |
| 2007/0155310 A1 | 7/2007 | Borcic et al. |
| 2007/0165572 A1 | 7/2007 | Lenzarini |
| 2007/0165599 A1 | 7/2007 | Skog et al. |
| 2007/0174471 A1 | 7/2007 | Van Rossum |
| 2007/0197227 A1 | 8/2007 | Naqvi et al. |
| 2007/0207782 A1 | 9/2007 | Tran |
| 2007/0207802 A1 | 9/2007 | Palmer et al. |
| 2007/0207804 A1 | 9/2007 | Sharma et al. |
| 2007/0217349 A1 | 9/2007 | Fodor et al. |
| 2007/0217366 A1 | 9/2007 | Sagi et al. |
| 2007/0226344 A1 | 9/2007 | Sparrell et al. |
| 2008/0043717 A1 | 2/2008 | Bellora et al. |
| 2008/0092178 A1 | 4/2008 | McNamara et al. |
| 2008/0130637 A1 | 6/2008 | Kant et al. |
| 2008/0162637 A1 | 7/2008 | Adamczyk et al. |
| 2008/0291905 A1 | 11/2008 | Chakravadhanula et al. |
| 2008/0316998 A1* | 12/2008 | Procopio et al. ............. 370/352 |

FOREIGN PATENT DOCUMENTS

| | | | |
|---|---|---|---|
| EP | 1672893 A1 | 6/2006 | |
| WO | WO-0154441 A1 | 7/2001 | |
| WO | WO-2007/010070 A2 | 1/2007 | |
| WO | WO-2007/117730 A2 | 10/2007 | |

OTHER PUBLICATIONS

International Search Report and Written Opinion, International Application No. PCT/US08/60656, Aylus Networks, Inc., Jul. 2, 2008, 8 pages.

International Search Report, International Application No. PCT/US 06/24619, date mailed Feb. 14, 2007, 2 pages.

OSGi Service Platform. Mar. 2003, The Open Services Gateway Initiative, Release 3. pp. 345-346, 505, 513-526 (602 pages).

(56) References Cited

OTHER PUBLICATIONS

Definition of 'proxy' from dictionary.com, http://dictionary.reference.com/browse/proxy, printed Mar. 14, 2009 (5 pages).
International Search Report, International Application No. PCT/US 06/24624, mailed Apr. 3, 2007, 1 pages.
GSM Association: "Video Share Service Definition 2.0." Mar. 27, 2007. XP002585831. http://www.gsmworld.com/documents/se41.pdf>. Retrieved on Jun. 2, 2010. 28 pages.
Nokia Corporation: "Video Sharing, Enrich Your Voice Call with Video." Nov. 1, 2004. XP002336424, 12 pages.
European Search Report for European Patent Application No. EP08746133 mailed Jun. 25, 2010. 8 pages.
International Search Report and Written Opinion for Application No. PCT/US08/57367, Aylus Networks, Inc., Aug. 8, 2008, 7 pages.
European Search Report for European Patent Application No. 08769004.6 mailed Jun. 21, 2012. 7 pages.

* cited by examiner

SYSTEMS AND METHODS FOR PRESENTING MULTIMEDIA OBJECTS IN CONJUNCTION WITH VOICE CALLS FROM A CIRCUIT-SWITCHED NETWORK

CROSS-REFERENCE TO RELATED APPLICATIONS

This application claims priority under 35 U.S.C. §119(e) to U.S. Provisional Patent Application No. 60/918,863, entitled "Systems and Methods for Rendering Multimedia Objects as Incoming Voice Call Indicators," filed Mar. 19, 2007; and claims priority under 35 U.S.C. §120 as a continuation-in-part of U.S. patent application Ser. No. 11/709,469, filed Feb. 22, 2007, entitled Systems and methods for enabling IP signaling in wireless networks; and claims priority under 35 U.S.C. §120 as a continuation-in-part of U.S. patent application Ser. No. 11/504,896 (U.S. Patent Pub. No. 2007/0197227), filed Aug. 16, 2006, entitled System and Method for Enabling Combinational Services in Wireless Networks By Using a Service Delivery Platform, (which in turn claims priority under 35 U.S.C. §119(e) to U.S. Provisional Patent Application No. 60/800,688, filed May 16, 2006, entitled System and Method for Supporting Combinational Services Without Simultaneous Packet and Circuit Connections and to U.S. Provisional Patent Application No. 60/809,029, filed May 26, 2006, entitled System and Method for Supporting Combinational Services Without Simultaneous Packet and Circuit Connections), the disclosures of each of the above are incorporated herein by reference in their entirety.

BACKGROUND

1. Field of the Invention

The present invention generally relates to wireless networks for voice and data communications, and more specifically to systems and methods for presenting multimedia objects in conjunction with voice calls from a circuit-switched network.

2. Description of Related Art

Current wireless networks support circuit-switched (CS) and packet-switched (PS) connections. Some wireless networks use a technology, known as mRAB (Multiple Radio Access Bearer) networks, that allows both types of connections to exist contemporaneously and may be made available to mobile handsets or user endpoints (UEs), e.g., UMTS/WCDMA networks.

CS and PS networks will now be described in greater detail. In a CS network such as PLMN, users' network mobile handsets are connected to Base Transceiver Stations (BTS) through a radio access network. The BTS in turn are connected to a plurality of Base Station Servers (BSC) that in turn are connected to a network of Mobile Switching Centers (MSC). The MSC provide wireless services to the users' handsets, and are also inter-connected with the Public Switched Telephone network (PSTN). This arrangement makes it possible for voice traffic to be carried between mobile handsets and landline telephone sets. The MSC in a wireless network effectively behaves as a switch that supports the mobility and roaming functions of a user's handset.

When a user's handset requests a telephone call or a service, such as voice mail, a prepaid call, or a toll-free call, it generates a "call event" at the MSC. Each call event can potentially "trigger" one or more Trigger Detection Points (TDP) in the MSC. When a call event triggers a particular TDP, the MSC sends a pre-specified message to a Service Control Function (SCF). The message includes, for example, the phone numbers of the calling and called parties, and the nature of the service request. The SCF then "fields" the message, i.e., service logic within the SCF responds appropriately to the message. In WIN/CAMEL implementations, the MSC and SCF communicate using standards-based protocols such as Transaction Capabilities Application Part (TCAP) from the family of protocols commonly referred to as Signaling System 7 (SS7).

For example, consider a "call origination" call event that happens when a user makes a new call request at the MSC. This call event triggers a corresponding TDP, causing the MSC to send a message with event-related information to the SCF, e.g., the calling and called numbers. The SCF then processes the message, e.g., by querying an internal or external database to verify that the calling party is authorized to initiate telephone calls. The SCF then responds back to the MSC with a message that indicates whether the call is "allowed" or "denied."

In a PS network, services are generally supported by IP Multimedia Subsystem (IMS). The IMS architecture manages the network with several control functions, i.e., functional entities. The Breakout Gateway Control Function (BGCF) is an inter-working function that handles legacy circuit-switched traffic. A new function called the Media Gateway Control Function (MGCF) controls the Media Gateway (MGW). The Media Resource Function Processor (MRFP), which is controlled by the Media Resource Control Function (MRFC), performs media processing functions. An IMS session is controlled by a logical function called the Call State Control Function (CSCF). It is logically partitioned into three functional entities, the Proxy, Interrogating and Serving CSCFs. The Proxy Call State Control Function (P-CSCF) is the first contact point for a user's handset. The Interrogating CSCF (I-CSCF) is mainly the contact point within an operator's network for all IMS connections destined to a subscriber of that network operator, or a roaming subscriber currently located within that network operator's service area. The Serving CSCF (S-CSCF) actually handles the session states in the network. "Third party" application servers (AS) provide services to the mobile handset, such as voice mail, via the S-CSCF. The IMS controls packet services among the different functional entities with signaling protocols such as Session Initiation Protocol (SIP), which is an IP-based signaling protocol designed for multimedia communications.

When a mobile handset first powers on, logic residing in the handset initiates a "registration" procedure with the IMS core, first by requesting the radio access network to assign it an IP address. After it receives an IP address, the mobile handset attempts to register as an IP-enabled endpoint with the IMS core, by sending a "register" request to the P-CSCF. Assuming that the handset is registering from a visiting domain, the P-CSCF then uses a Domain Name Server (DNS) to search for the handset's home domain S-CSCF. Once the P-CSCF locates the S-CSCF for the mobile handset, it passes the "register" request to that S-CSCF. The S-CSCF contacts the Home Subscriber Subsystem (HSS), which looks up the mobile handset's profile. This profile contains assorted information about the user, and what services the handset is authorized to use. A logical function in the S-CSCF called the "registrar" then authenticates the mobile handset, e.g., verifies that the handset is legitimate.

The S-CSCF also loads Service Point Triggers (SPT) from the handset's profile. The SPT define the appropriate action for the S-CSCF to take when the handset or an AS requests a transaction. For example, if the handset requests voice mail service, the SPT triggers the S-CSCF to provide the addresses of the voice mail AS for the handset. So long as the handset is powered on, the SPT for that handset are loaded into the S-CSCF, so a service request fires the appropriate trigger in the S-CSCF. The SPT are analogous to the above-described TDP in the CS network. The SPT and TDP both trigger an appropriate response from a controlling server, e.g., the MSC or S-CSCF. However, the TDP are more generally applicable to call requests and call related events such as dialed number, etc., and are not particular to the user's profile. The SPT are specific to the mobile handset, and are stored in the user's profile in the HSS and loaded into the S-CSCF when the handset registers.

If an entity wishes to engage in a transaction with the mobile handset, e.g., to send a message to the handset, the entity utilizes an AS to send a request for the transaction to the S-CSCF. This triggers an SPT in the S-CSCF, which recognizes the request as pertaining to a registered handset and sends the appropriate information to the handset. Other ASs may not know which S-CSCF to contact in order to engage in a transaction with a particular handset. In this case, the AS interrogate a Subscriber Location Function (SLF), which provides information about a handset's S-CSCF to the AS, which then contacts that S-CSCF as described above. If the handset wishes to request a service, it sends the request to the S-CSCF, e.g., using a SIP invite. This triggers an SPT in the S-CSCF, which then directs the service request to a particular Application Server (AS), which then provides the service to the handset. For example, if the user wants to initiate an IMS call, it sends a SIP invite message to the S-CSCF, which may then contact the AS responsible for IMS calls, called the Back-to-Back User Agent (B2BUA), which initiates the IMS call flow.

SUMMARY

The present invention provides systems and methods for presenting multimedia objects in conjunction with a voice call via a circuit switched (CS) network.

In one aspect, the invention provides method for delivering and presenting a multimedia object in conjunction with a voice call to a recipient handset over a wireless network utilizing multiple Radio Access Bearer (mRAB) technology comprising: a circuit switched (CS) network initiating a voice call to a recipient handset over the CS network; the CS network in response to the voice call sending a trigger message about the state of the voice call to the serving node (SN) residing on a packet switched (PS) network; the SN initiating transfer of a multimedia object to a PS radio channel of the recipient handset over the PS network; the recipient handset receiving the voice call on a CS radio channel over the CS network and the multimedia object on the PS radio channel over the PS network; and the recipient handset presenting the multimedia object in conjunction with the voice call.

In another aspect, the invention provides a method for delivering and presenting a multimedia object in conjunction with a voice call to a recipient handset over a circuit switched (CS) network comprising: preloading a multimedia object to a recipient handset over a packet switched (PS) network; a CS network delivering a voice call to the recipient handset over a CS radio channel; in response to the received voice call, the recipient handset presenting the multimedia object in conjunction with the voice call.

In yet another aspect, the invention provides a system for delivering and presenting a multimedia object in conjunction with a voice call to a recipient handset over a wireless network utilizing multiple Radio Access Bearer (mRAB) technology, by coordinating operation of a circuit-switched (CS) network and a packet switched (PS) network, the system comprising: a serving node (SN), residing on a PS network, responsive to a voice call on the CS network, having logic to select and initiate transfer of a multimedia object to the recipient handset over the PS network; and a personal agent (PA) logic, on the recipient handset, for presenting the multimedia object in conjunction with the voice call.

In still another aspect, the invention provides a system for delivering and presenting a multimedia object in conjunction with a voice call to a recipient handset, the voice call being delivered over a circuit switched (CS) network and the multimedia object being delivered over the packet switched (PS) network, the system comprising: a serving node (SN), residing on a PS network, for preloading a multimedia object to a recipient handset over the PS network; and a personal agent (PA) logic on the recipient handset for presenting the multimedia object in response to a voice call over the CS network.

The systems and methods can comprise a serving node (SN) and/or a personal agent (PA) on the initiator handset to select the multimedia object in response to the profile information for the initiator or the recipient. The selection of the multimedia object to be transferred can be in response to the time of day or logic residing in the initiator handset. The selection of the multimedia object to be transferred can be updated periodically and can be pre-provisioned in the SN by a party other than the initiator or the recipient. The CS network trigger messages can be generated by a trigger detection point (TDP) in a mobile switching center (MSC) switch residing in the CS network.

The SN initiated transfer can be controlled so that the multimedia object is delivered for the start of the voice call. The recipient handset can comprise a personal agent (PA) to coordinate the timing of the voice call and the presentation of the multimedia object on the recipient handset. The serving node (SN) can preload the multimedia object onto the recipient handset via the PS network prior to the initiation of the voice call. If preloaded, the multimedia object can reside on the recipient handset prior to being displayed.

The multimedia object can be provided by a party other than the initiator or the recipient. An example of such multimedia object is an advertisement object, such an electronic image or a video clip. The multimedia object can be presented contemporaneously with the voice call alert, during the voice call, or after the termination of the voice call.

In some of the systems and methods above, the recipient handset only needs to be capable of operating a CS radio or a PS radio at a given time. In this case, the multimedia object is preloaded onto the recipient handset via a PS network when the CS radio of the handset is inactive. In some systems and methods above, the recipient handset needs to be capable of operating a CS radio and a PS radio concurrently.

DETAILED DESCRIPTION

Figure 1:
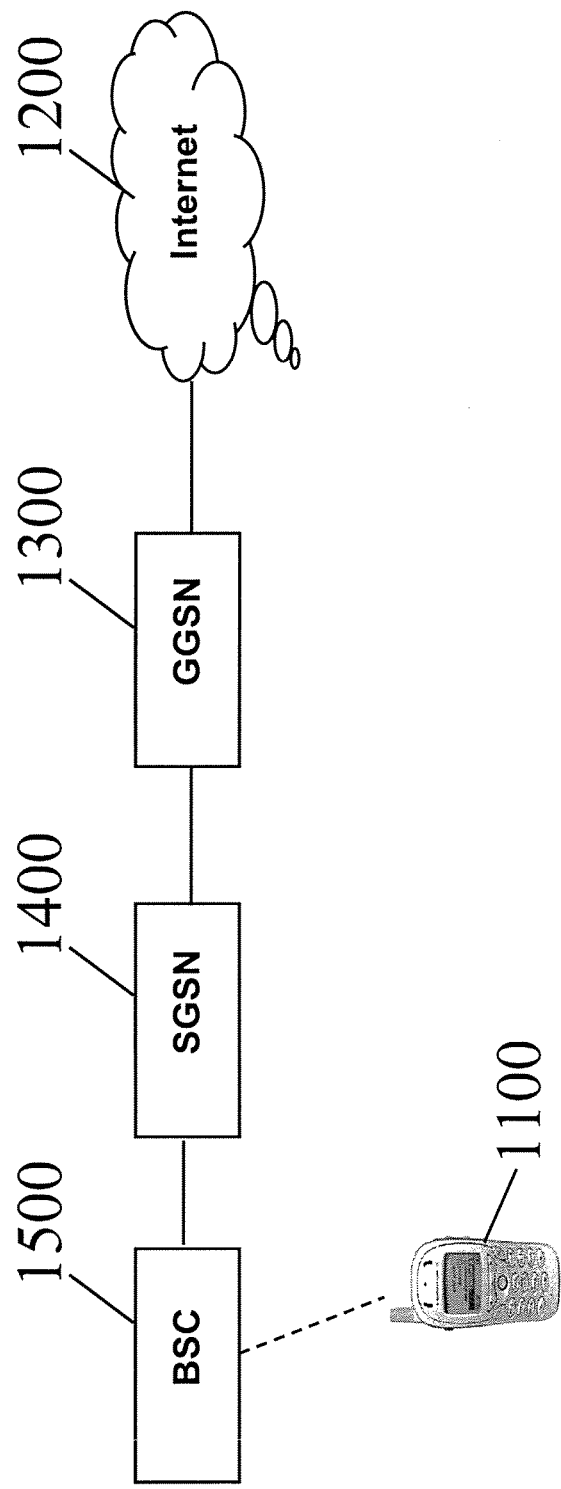
FIG. 1 illustrates a GSM/GPRS packet-switched network architecture.

The present invention provides systems and methods for presenting multimedia objects in conjunction with a voice call from a CS network. The voice call is delivered over a circuit-switched (CS) network and the multimedia object is delivered over a packet-switched (PS) network. Since the multimedia object is carried by the packet-switched (PS) network and the voice call is carried by the CS network, coordination is generally needed between the CS and PS networks such that the multimedia object can be presented at the appropriate times, e.g., at the start of the call, during the call or after the call. Preferably, the delays to call setup times are minimized. The call setup delay can be reduced by preloading the multimedia object onto recipient handset before initiation of the voice call. The coordination between the CS network and the PS network is achieved using a serving node (SN). The SN can also include logic for selection of a multimedia object to be transferred, for example, to select a multimedia object in response to the recipient or the initiator profile information. This selection can be made based on a variety of criteria, for example the recipient profile, the initiator profile, the time of the day, or any other desired criteria. The selection can be updated periodically, for example, every hour, every 4 hours, every 8 hours, every 12 hours, every 24 hours, etc.

In some embodiments, the initiator and/or the recipient handset includes personal agent (PA) logic. The PA residing in the initiator handset can be used to select the multimedia object to be delivered to the recipient in conjunction with a voice call. The PA in the recipient handset can determine whether to present the multimedia object at the start, during, or after the voice call, or it can select which object to render from a plurality of multimedia objects received by the handset via the PS network, or a plurality of multimedia objects residing in the recipient handset. The systems and methods described herein are applicable to IMS and non-IMS networks.

The systems and methods of the invention enable multimedia objects to be rendered on a recipient handset as incoming call notifications, coordinated with an incoming voice call request. In some embodiments the systems and methods personalize the voice calling experience by enabling an originating voice call subscriber to choose a multimedia object and have it rendered on the receiving handset as an integral part of the incoming voice call indication. In other embodiments, the systems and methods are used in mobile advertising. We shall use the term Image Ring or Video Ring to denote this service experience. In WCDMA/UMTS networks this involves coordinating the CS and PS connections for an originating voice call request. In other wireless networks, a mobile handset may have access to either a CS connection or a PS connection but not both at the same time. In such networks, the coordination between the CS and PS connections is either more involved and complicated and may require serial sequencing of certain signaling and media connections, or the multimedia object needs to be preloaded onto the recipient handset prior to initiation of the voice call. Moreover, even if a mobile handset has a PS connection, it may lose packet connectivity due to a policy implemented by a network operator (e.g., in a situation where the operator has a limited number of IP addresses that need to be shared amongst a large number of handsets). In this case, because the mobile handset is no longer assigned an IP address, it is not reachable by addressing schemes based on IP addresses, i.e., it is not IP-accessible. In such situations, the coordination schemes used in Image/Video Ring will involve methods that involve the acquisition of an IP address by the receiving User Endpoint (UE).

The multimedia object can be an image (e.g. a photograph, a graphic, etc.), a video clip, an audio-video clip, an animation, a sound clip, or an object comprising a combination thereof.

In some embodiments, the multimedia object is an advertisement object. The advertisement object can be provided by a party other than the caller and the recipient, for example, by an advertiser. An advertiser can be a business advertising its own or someone else's goods or services. In a typical scenario, the advertisement is targeted to the recipient. The advertiser can also be a party that is sponsoring the voice call between the initiator and the recipient. The logic and/or the data to associate a multimedia object and a voice call can be provided by the advertiser.

Since different wireless networks depend on a variety of different technologies whose capabilities to support CS and PS connections vary widely, different systems and methods may be needed for different wireless technologies so that the coordination is reasonably accurate and no extraneous delay or "lag" is introduced to the voice call setup time.

We begin by describing IP signaling in mobile devices and how IP connectivity can be re-established if handset becomes not IP-accessible. We then describe how a CS network can be used to initiate connection to the PS network using a service delivery platform (SDP). We then focus our attention on the Serving Node (SN) and the personal agent (PA) components of the SDP. Finally, we describe the details of the system and methods for presenting multimedia objects in conjunction with voice calls from a CS network.

IP Signaling in Mobile Devices

As is known to persons skilled in the art, in some circumstances a network operator may disconnect a mobile handset from a packet-switched (PS) network by withdrawing its IP address. For example, if a first mobile handset registers to the IMS network, thus obtaining an IP address, but then does not use its IMS connection for a specified period of time, the network may withdraw its IP address and assign that address to a second mobile handset. In this case, the first handset is disconnected from the IMS network, and thus no longer IP accessible until it re-registers to the IMS network. When a handset loses its IP address and is disconnected from the IMS network, it can no longer participate in IP-based services. Systems and methods described below allow another entity, such as another handset or a network entity, to send an IP-based message to a handset that lacks an IP address, in effect "waking up" the handset and causing it to initiate its own request for an IP address, so that it can receive the IP-based message.

Uses of IP Signaling in Mobile Services

As an example of an IP service that would benefit from user-to-user (handset-to-handset) IP signaling, consider the case in which party A wishes to place a voice call to party B, and to transmit a photograph as part of "call alerting." It is expected that party B will receive the call alert (indicated by "ringing") and the photograph synchronously, e.g., party B may use the photograph to identify the calling party. In order to transmit the image to party B, party A's handset needs to establish a packet connection to party B's handset and negotiate resources and capabilities. However, if party B's handset is disconnected from the IMS network, party A's handset cannot send the photograph to party B's handset. Further details on this kind of interaction may be found in U.S. Patent Pub. No. 2007/0197227, the entire contents of which are incorporated herein by reference.

As an example of an IP service that would benefit from network-to-user (network-to-handset) IP signaling, consider the case in which a network server wishes to transmit a multimedia object to a mobile handset. In order to begin transmitting the object, the server needs to know the capabilities of the handset. If the handset is not IP accessible, the network server may not reach the handset to begin resource negotiation or to transmit the object.

Conditions Under Which Handsets May Not be IP-Accessible

FIG. 1 depicts components in a GSM/GPRS packet-switched (PS) network, and their communication pathways to an IP network, e.g., the Internet 1200, and to handset 1100. The GSM/GPRS network includes one or more Base Station Servers (BSC) 1500, which are in communication with handset 1100, Serving Gateway Support Node (SGSN) 1400, and GPRS Gateway Support Node (GGSN) 1300, which is in communication with Internet 1200. GGSN 1300 and SGSN 1400 work collaboratively to assign an IP address from Internet 1200 to mobile handset 1100. Specifically, GGSN 1300 communicates with Internet 1200, and allocates IP addresses for user handsets, e.g., handset 1100. SGSN 1400 communicates with GGSN 1300 and with base station server (BSC) 1500 to provide a wireless connection between handset 1100 and Internet 1200. When this is accomplished, it is said that mobile handset 1100 has a Packet Data Protocol (PDP) context.

Most network operators implement a policy that de-establishes the PDP context of a mobile handset when it is not used. Such de-commissioning is typically implemented within a time period of a few minutes. When the handset loses its PDP context, it does not have an IP address assigned to it and is not reachable by IP-based addressing schemes. At some time in the future, the handset may initiate a data request, causing a new PDP context to be established for this handset, including obtaining a new IP address to the handset. In other words, if a handset lacking an IP address requests an IP connection, then it can initiate that connection, but if another entity requests an IP connection with a handset lacking an IP address, the entity cannot itself establish that connection. It is possible for a network operator to assign a "static" IP address to a mobile handset, so that it will remain connected to the IP network, but this is atypical because IP addresses are a valuable resource in short supply.

Figure 2:
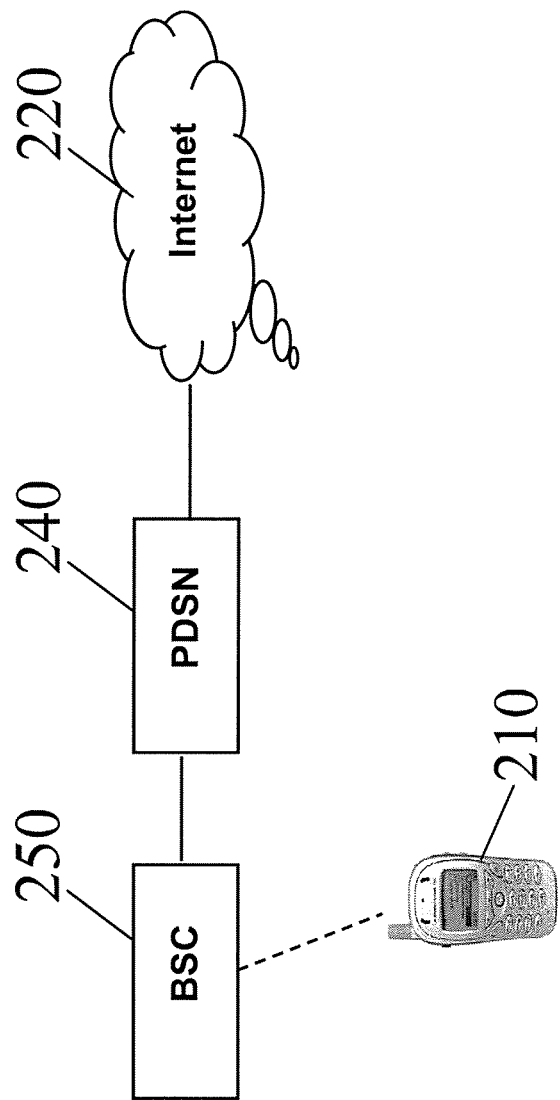
FIG. 2 illustrates a CDMA circuit-switched network architecture.

FIG. 2 depicts components in a CDMA circuit-switched (CS) network, and their communication pathways to an IP network, e.g., Internet 220, and to mobile handset 210. The CDMA network includes one or more Base Station Servers (BSC) 250, which are in communication with handset 210, and Packet Data Serving Node (PDSN) 240, which is in communication with Internet 220. A Point-to-Point protocol (PPP) session exists between the mobile handset 210 and PDSN 240. PDSN 240 acts as a connection point between BSC 250 and an IP network, e.g., Internet 220, by assigning handset 210 an IP address from Internet 220 and providing access to the Internet 220. As practitioners skilled in the art know, the PPP session may be maintained even if the handset goes "dormant," so the handset will remain IP-accessible. An incoming packet for a dormant mobile handset then waits at the packet control function (PCF) upon a "mobile origination" message from the handset in response to overhead messages generated collaboratively by the PCF and the BSC. However, network operators in such networks typically choose to de-allocate IP addresses and tear down the PPP session in order to conserve IP addresses, if the mobile handset does not use its PPP session for a specified period of time. If the mobile handset 210 does not have a PPP session, other entities cannot contact it via the IP network.

Even if a mobile handset is not IP-accessible, e.g., because the GSM/GPRS or CDMA network has de-allocated its IP address, it still has a connection to the circuit-switched (CS) network; as described above, the CS connection can be used to initiate and receive voice calls, SMS and other circuit-switched services.

Systems and Methods for Initiating IP Connectivity to Handsets Lacking IP Addresses If a mobile handset lacks an IP address and so cannot be directly contacted by another entity, the handset's existing CS connection can be exploited to cause the handset to initiate its own connection to the PS network. Specifically, a specified message, or "trigger," is sent to the handset via the CS network, instructing logic residing on the handset to initiate a connection to the PS network.

One system that can facilitate this interaction is the Service Delivery Platform (SDP) described in detail in U.S. Patent Pub. No. 2007/0197227. Descriptions of other systems and/or components may be found in the incorporated patent references, given below. An overview of the service delivery platform is provided below.

Overview of Service Delivery Platform

Briefly, the SDP includes a Serving Node (SN) that may communicate with both the CS voice network and the packet-switched network (with or without IMS). The SDP also includes a Personal Agent (PA), which is a piece of service logic that resides in the mobile handset(s). The PA and the SN can send messages to each other, e.g., regarding services the user would like to use, the local network environment of the handset, or instructions the SN would like the PA to execute on the handset.

The service delivery platform includes a Serving Node (SN) that supports combinational services by communicating with both the circuit-switched voice network and the packet-based IMS network. In particular, the SN is simultaneously aware of the states of the Service Control Function (SCF) services of a voice call between User Endpoints (UE), and of the registration states of UEs involved in a packet session. The service delivery platform also includes a Personal Agent (PA), which is a piece of service logic that resides in the UEs. The PA sends messages to the SN regarding services that the user would like to use, and also regarding its local network environment. The SN then responds appropriately by making appropriate voice network and/or IMS network services available to the user. Thus, the service delivery platform has one "eye" on the circuit-switched voice network and another "eye" on the IMS network, allowing it to deliver combinational services to users without needing to upgrade the existing network to 3G.

Figure 3:
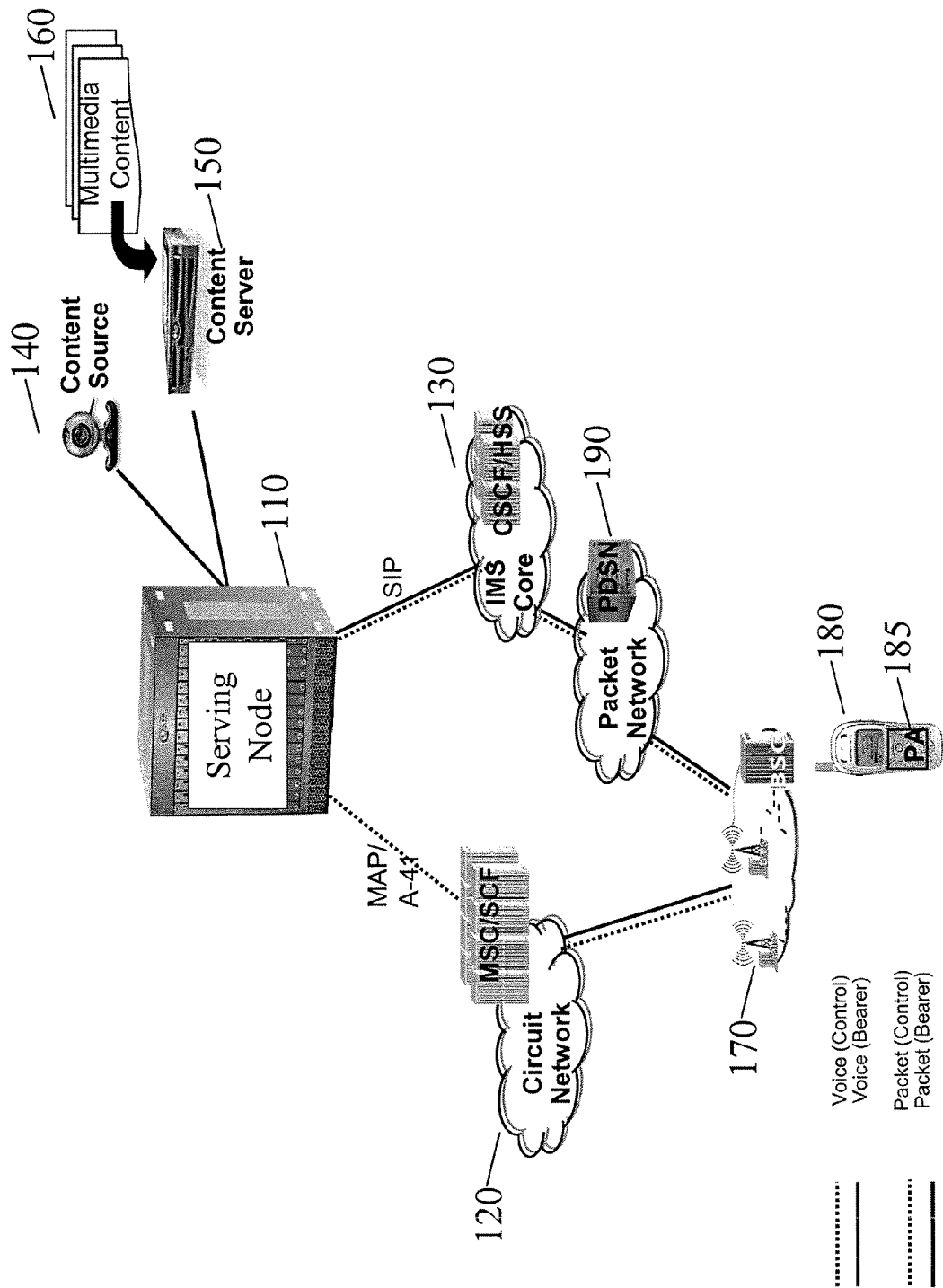
FIG. 3 illustrates an overview of the service delivery platform (SDP) and its connections to the circuit-switched (CS) and packet-switched (PS) networks.

FIG. 3 is an overview of the service delivery platform and its connections to the circuit-switched and packet-switched networks. The service delivery platform includes SN 110 and PA 185, which resides on UE 180. As discussed in greater detail below, SN 110 and PA 185 communicate with each other via the existing circuit-switched and packet-switched network infrastructures in order to provide combinational services to the user.

The existing "2G" infrastructure includes radio access network 170, circuit-switched (CS) network 120, packet-switched (PS) network 190, and IMS core 130. As described above, CS network 120 includes Mobile Switching Center(s) (MSC) that provides wireless voice services to UE 180 over radio access network 170. PS network 190 includes Packet Data Serving Node(s) (PDSN) that act as the connection point between radio access network 170 and IMS core 130. IMS core 130 includes CSCF(s) and HSS(s) that provide multimedia services to UE 180 via PS network 190 and radio access network 170. However, as noted above, even if UE 180 is capable of processing signals from either network, i.e., can process a voice call or a multimedia session, radio access network 170 cannot support simultaneous connections between UE 180, CS network 120, and PS network 190. In other words, CS network 120, PS network 190, and radio access network 170 are not, by themselves, capable of providing combinational services to UE 180.

The service delivery platform provides combinational services to UE 180 as follows. SN 110 communicates both with CS network 120 and with IMS core 130, and appears like a normal system component to each of the two networks.

In CS network 120, normally when UE 180 requests a voice call or other service on CS network 120, the request triggers a Trigger Detection Point (TDP) at the MSC, and the MSC then sends a pre-specified message to a Service Control Function (SCF) that responds appropriately. The message includes, for example, the phone numbers of the calling and called parties, and the nature of the service request. However, in the service delivery platform, the MSC is programmed to provide the pre-specified message to SN 110 instead of to the SCF. Logic operating in SN 110 then processes the message, much as the SCF normally would, and returns a completion code to the MSC indicating that it may now proceed to process the voice call request. SN 110 thus learns information about services on the circuit-switched network that UE 180 invokes, e.g., the phone numbers of the calling and called parties, and the nature of the service, and also can authorize or even modify the service request when it returns the completion code to the MSC on CS network 120. Thus, SN 110 looks like an SCF to the MSC. SN 110 provides a control path to the CS network, but not a bearer path.

In the IMS core 130, the S-CSCF normally communicates with "third party" ASs in order to provide services to UE 180. Specifically, if an AS wants to communicate with UE 180, it sends a request to the S-CSCF which triggers a Service Point Trigger (SPT) in the S-CSCF. The SPT are analogous to the TDP of the MSC in the CS network 120, with some differences, as described in greater detail above. The SPT causes the S-CSCF to communicate appropriately with the UE 180. If UE 180 wants to communicate with an AS, i.e., to receive a service, it sends a SIP message to the S-CSCF, which triggers an SPT that instructs the S-CSCF to contact an AS to provide that service. In the described service delivery platform, SN 110 operates much like an AS, and indeed looks like an AS to the IMS core 130. When SN 110 wants to contact UE 180, it sends a transaction request to the S-CSCF, where it generates an SPT for the S-CSCF to forward the request to the UE. If UE 180 wants to contact the SN 110, it sends a SIP invite message to the S-CSCF, which generates an SPT for the S-CSCF to send the request to SN 110. The SN 110 then uses service logic to execute that request. Thus, in order to internetwork IMS 130 and SN 110, the S-CSCF simply needs to be configured to recognize the SN 110 as an AS. This allows SN 110 to learn about the packet-based connections that the UE and/or AS make with the S-CSCF. SN 110 provides both control and bearer connectivity to the IMS core 130 and external endpoints. Methods of interaction between SN 110 and the IMS core 130 are discussed in greater detail in U.S. Patent Pub. No. 2006/0291488, the entire contents of which are incorporated herein by reference.

To readily communicate with CS network 120 and IMS core 130, SN 110 supports protocols for CS communications, e.g., SS7, and protocols for PS/IMS communications e.g., IP. For example, if SN 110 is exchanging a message with PA 185 in circuit-switched mode, it may use DTAP and if SN is exchanging a message with PA 185 in packet-switched mode, it uses SIP. DTAP (Direct Transfer Application Part) is a protocol that carries messages between the handset and a switch and which is not interpreted by the intervening radio access network. Other protocols, such USSD (Unstructured Supplementary Services Data) can also be used. The protocol the service delivery platform, i.e., SN 110 and PA 185, uses depends on which network is more appropriate for the message.

In general, the triggering mechanisms such as TDP and SPT are examples of mechanisms that can be used to transfer information from the CS network 120 and the IMS core 130 to SN 110; any mechanism that allows SN 110 to learn sufficient information about the UE's connections to the two networks can be used. One example is Unstructured Supplementary Services Data (USSD).

In addition to signaling traffic, SN 110 can also receive media traffic from content source(s) 140, e.g., camcorders or digital cameras, and content server(s) 150 that are capable of providing multimedia content 160. This functionality is described in greater detail below.

Serving Node Component of Service Delivery Platform

Figure 4:
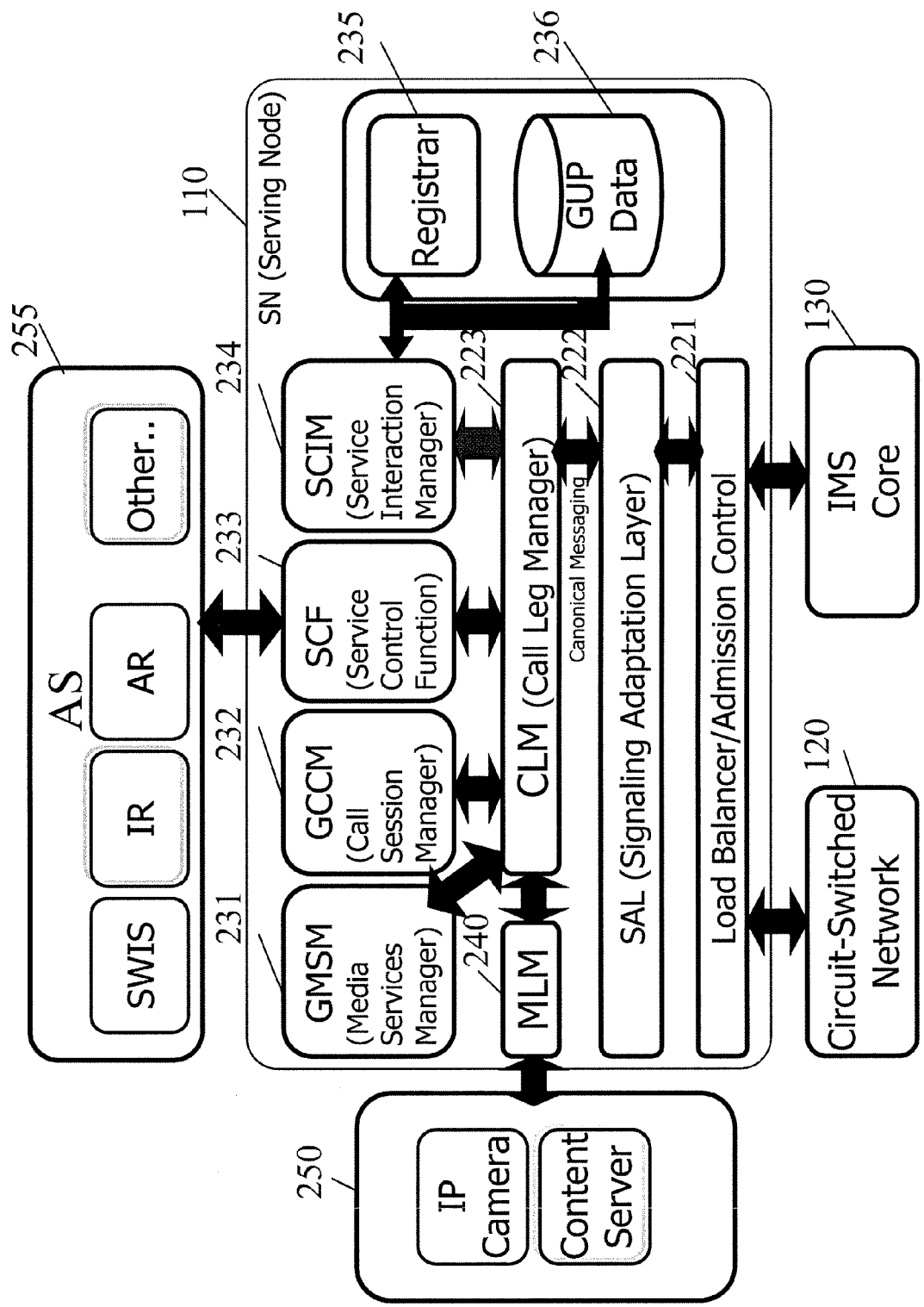
FIG. 4 illustrates the logical components of the serving node (SN) component of the service delivery platform (SDP)

As described above, SN 110 communicates with CS network 120 and IMS core 130. As illustrated in FIG. 4, SN 110 includes Load Balancer/Admission Control 221, which includes a series of load balancing functions that handle incoming signals from CS network 120 and IMS core 130. Load Balancer/Admission Control 221 then passes the signals to Signaling Adaptation Layer (SAL) 222, which aggregates the signals into a common internal form.

Call Leg Manager (CLM) 223 then logically processes the aggregated signals. As will be readily apparent to skilled practitioners in the art, call models used to describe telephone connections often split call states in one or more "call legs." In combinational services since both a voice call and a packet connection may exist contemporaneously the various call legs are integrated into a single logical session by another function called the General Call Session Manager (GCCM) 232. Control of call legs is discussed in greater detail in U.S. Patent Pub. No. 2006/0291488, the entire contents of which are incorporated herein by reference.

In addition to signaling traffic, SN 110 can also receive media traffic from content servers 250, such as camcorders, external cameras, or proxies for same. A logical function called the Media Leg Manager (MLM) 240 handles this media traffic, using protocols such as RTP, IP, and/or RTSP. Media traffic may also be re-directed by SN 110 under roaming scenarios, as described in greater detail in U.S. Patent Pub. No. 2006/0291412, the entire contents of which are incorporated herein by reference. Various media servers and content servers will be not necessarily be aware of SN 110; rather, SN 110 may act as a proxy and retrieve content and media from such servers, then process it and transmit it to mobile handsets. In order to carry out these functions, SN 110 supports various proxy functions.

SN 110 supports a variety of combinational services, some examples of which are described below, and also provides an interface for supporting 3$^{rd}$ party Application Servers (AS) 255. These services, as stated earlier, generally involve contemporaneous circuit-switched and packet-switched connections. Some examples of such services as "See What I See" (SWIS), "Image Ring" (IR), and "Ad Ring" (AR) are described in greater detail below. The architecture of SN 110 includes SCF 233 and Registrar 235 components cooperatively to make such services possible. In those cases where an external media service is needed, the proxy components of SN 110 may be used to receive the external media, process it internally for use in mobile handsets, and then transmit the media to the handsets. Under roaming situations, SN may also use its mobility management components as described in greater detail in U.S. Patent Pub. No. 2006/0291412, the entire contents of which are incorporated herein by reference, to ensure that a favorable network connection is used to deliver the media to the roaming mobile handset. In particular, services from the circuit-switched and packet-switched networks may be combined in various temporal sequences and modalities. SN 110 contains a Service Control Interaction Manager (SCIM) 234 component that uses policy driven service logic to resolve feature interactions when services are combined from different or the same networks are combined in various ways.

For security, privacy, management and efficiency reasons, the PS logic only responds to messages from SN. And since it is only the SN that is aware of both the PS and CS connections and impending and ongoing call state information, the SN is useful in delivering and coordinating the advertisements. The PA logic provides flexibility in which advertisements are shown when to the recipient. However, it is possible to envision a system in which the PA logic is not used to provide such flexibility. In this embodiment, a fixed rendering mechanism may be used (e.g., provided by the handset manufacturer) in the handset that employs a single algorithm to render the advertisements. This algorithm may be updated by sending an SMS message to the recipient handset. The user is then required to "click" on the received SMS message that causes a new algorithm to be loaded from the SN on to the handset.

Personal Agent Component of the Service Delivery Platform

A special piece of service logic installed in a user's handset is referred to as the Personal Agent (PA). The basic architecture of PA 185 assumes that the handset supports connections to both the circuit-switched (CS) network 120 and the packet-switched (PS) network 190, which are described in greater detail above. Generally, some handsets simultaneously support connections to both networks, and other handsets support a connection to only one network at a time. Here, the handset is assumed to support a number of CS signaling channels (CS Sch 1-n), and also a number of PS signaling channels (PS Sch 1-n). Thus, when a network entity such as SN 110 sends a message to PA 185 via CS network 120 or PS network 190, the message arrives at the corresponding signaling channel (CS Sch 1-n or PS Sch 1-n).

Figure 5:
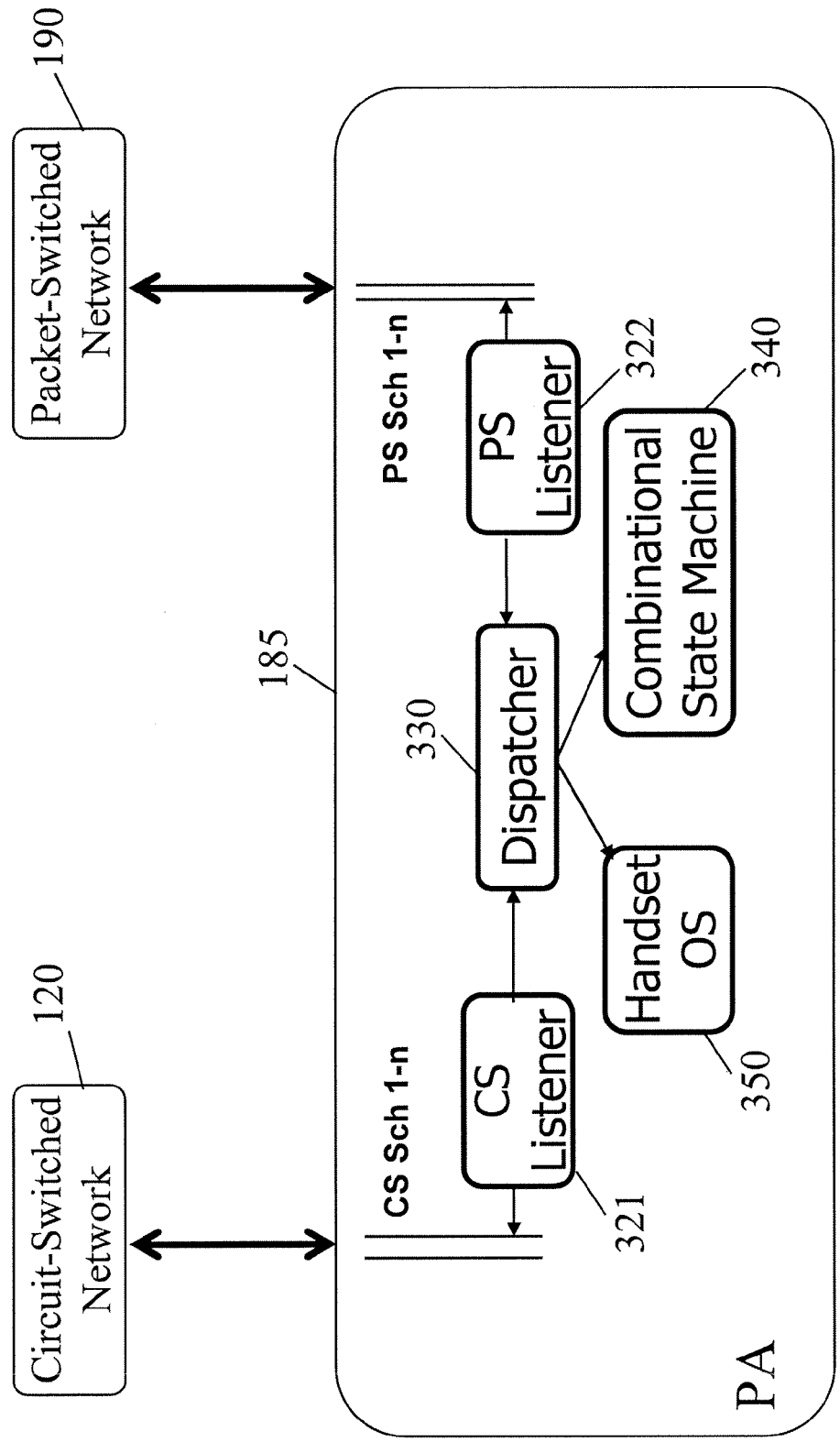
FIG. 5 illustrates the logical components of the personal agent (PA) component of the service delivery platform (SDP)

As illustrated in FIG. 5, the PA includes CS "Listener" 321 and PS "Listener" 322, which receive messages on the signaling channels (CS Sch 1-n) and (PS Sch 1-n), respectively. CS Listener 321 and PS Listener 322 direct these messages to another service logic component called the "Dispatcher" 330. Dispatcher 330 uses internal logic to direct the messages appropriately either to the handset's operating system (OS) 350 or to the Combinational State Machine 340. Combinational State Machine 340 handles the message according to its service logic. The actions of the combinational state machine are specific to the service that is being implemented. For example, if the service were "Image Ring," described in more detail below, and the incoming message was a call alert, then the state machine would specify actions that would render an image on the display including a Caller ID indication and simultaneous ringing of the phone.

As an illustrative example, consider a combinational service in which party A wishes to transmit a picture to party B while making a circuit-switched switched voice call to party B. Further assume that the underlying wireless network does not support multiple radio access bearers (mRAB). Thus, both handsets already share a CS connection, and not a PS connection. In such a case, the PA in the handset of party A sends a message e.g., using a USSD message, to the PA in the handset of party B via CS network 120 and SN 110. The message includes instructions to end the CS voice call; initiate a PS connection to receive the picture; and to end the PS connection.

The appropriate Listener in party B's handset receives the message and transmits it to the Dispatcher, which then sends it to the Combinational State Machine. The Combinational State Machine in party B's handset then interprets the message, terminates the CS voice call, initiates a PS connection to receive the picture and, after receiving the picture, terminates the PS connection. Then, the Combinational State Machine in party A's handset initiates a new CS voice call to party B's handset, and the parties can continue talking.

Some other illustrative examples of combinational services that the service delivery platform provides will now be described.

Synchronizing Packet-Switched and Circuit-Switched Connections, e.g., Image Ring/Ad Ring Because the service delivery platform has knowledge of both the CS and PS networks, the platform could be said to be aware of the circuit and packet components of combinational services. Specifically, the SN and the PA can be used together to synchronize a packet-switched connection with a circuit-switched connection in the user's handset, even if the handset itself cannot simultaneously support both kinds of connections.

Figure 7:
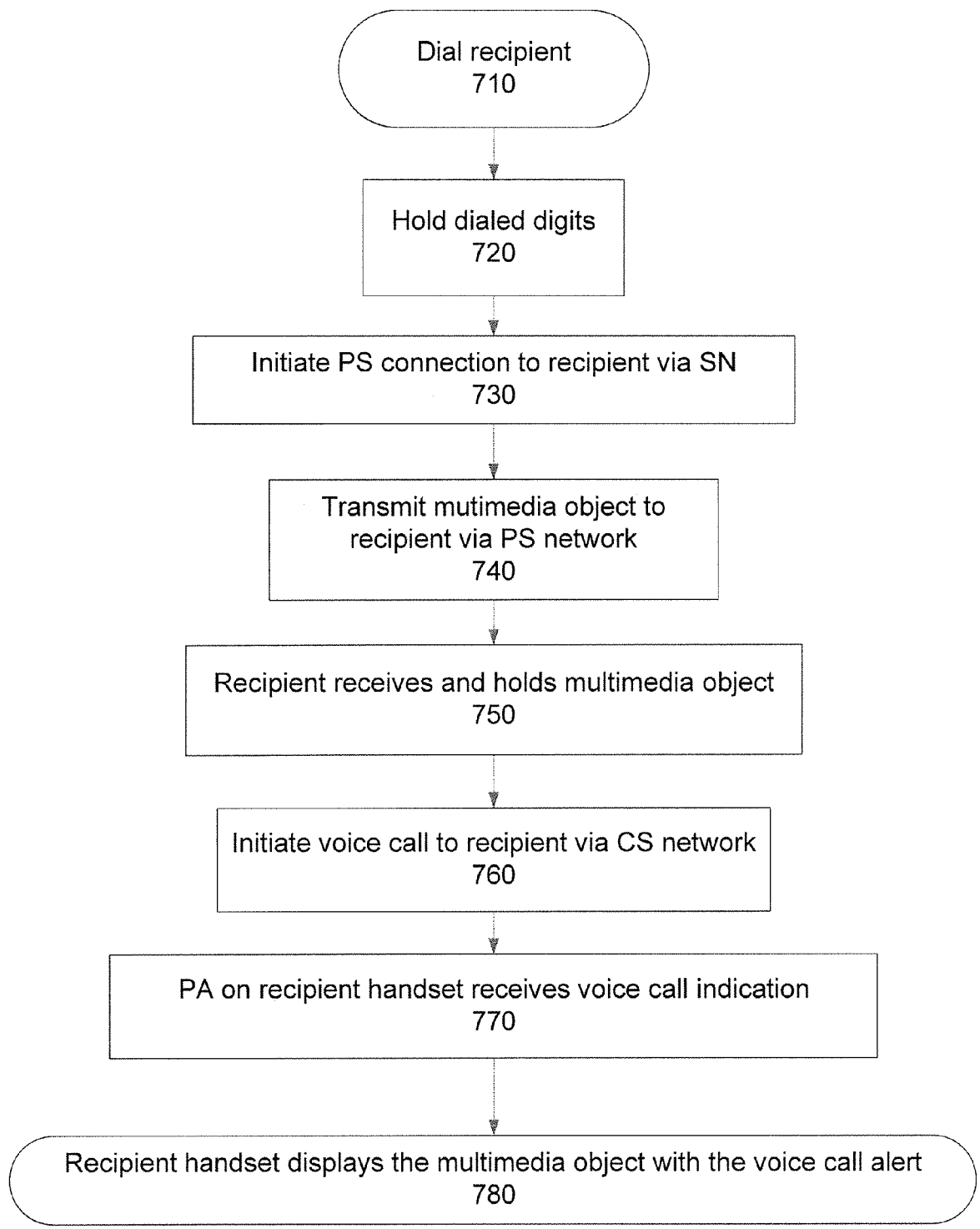
FIG. 7 illustrates an exemplary flowchart according to one embodiment of the invention.

In an exemplary embodiment illustrated in FIG. 7, if party A calls party B, the service delivery platform can precede the circuit-switched voice call with a packet-switched data connection. The service delivery platform can play an announcement or display a picture on party B's handset before presenting a "voice call indication" that alerts party B that party A is attempting to call him. In such a case, the PA in party B's handset receives the announcement or picture via the PS network, and holds the announcement or picture until it also receives the "voice call indication" via the CS network. Then, the PA in party B's handset synchronizes the rendering of the announcement or picture with the alert that party A is attempting to call. This can be done, e.g., with the following sequence of steps:

710. Party A dials the telephone number of party B.
720. The PA on party A's handset captures and holds the dialed digits.
730. The PA on party A's handset initiates and establishes a packet connection to party B's handset via SN.
740. The PA on party A's handset transmits a multimedia object, e.g., an announcement or picture, to the PA on party B's handset.
750. The PA on party B's handset receives and holds the multimedia object.
760. The PA on party A's handset initiates a circuit-switched voice call to party B's handset.

770. The PA on party B's handset receives a voice call indication.

780. The PA on party B's handset synchronizes the display/presentation of the multimedia object with the alert that party B is receiving a voice call from party A.

Figure 8:
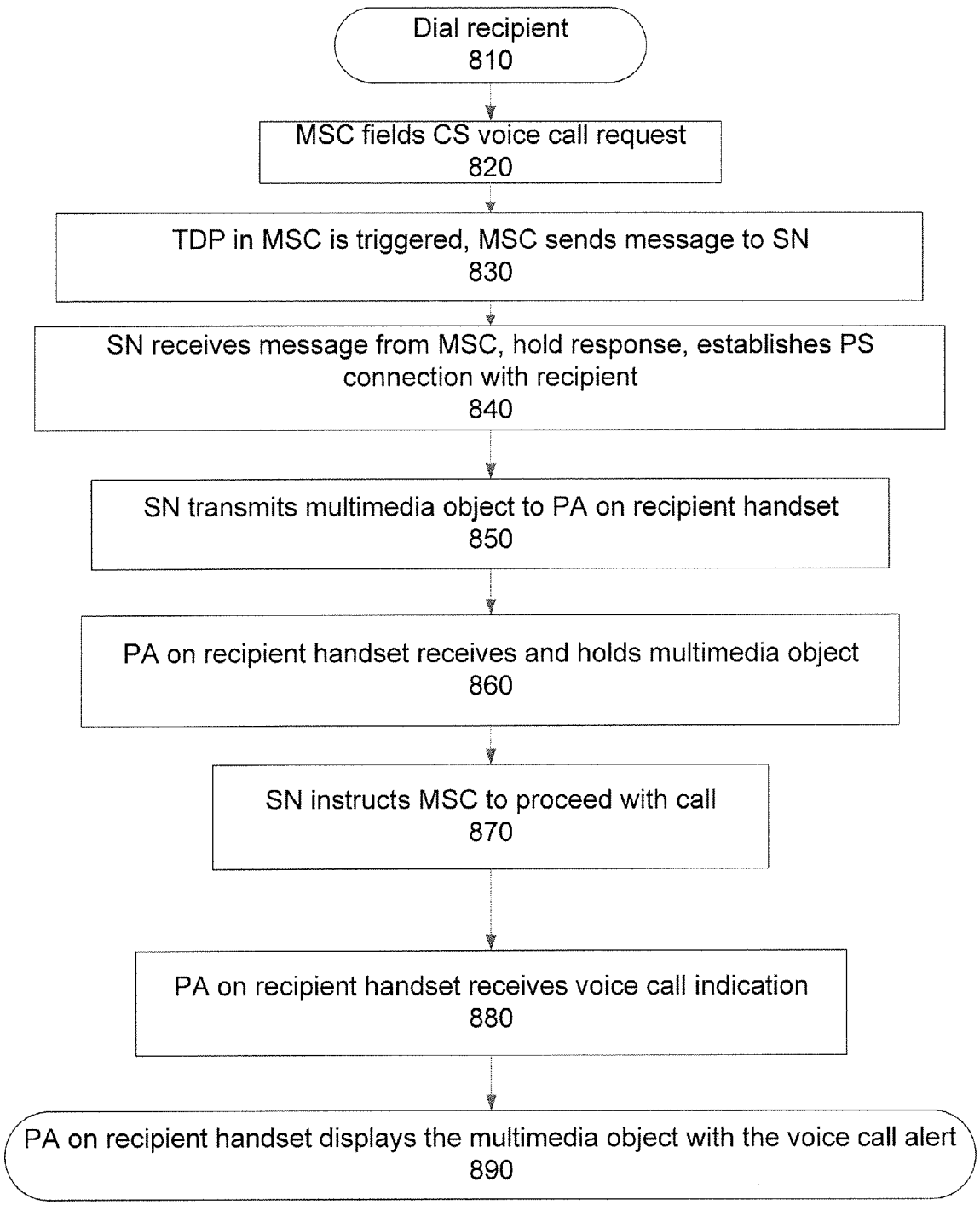
FIG. 8 illustrates an exemplary flowchart according to one embodiment of the invention.

It should be observed that step 720, above, introduces a delay in the overall process, so that after party A dials party B's phone number, party A will have to wait for the service delivery platform to establish the packet connection and to deliver the multimedia object before establishing the voice call. This delay may be circumvented, however. For example, the multimedia object (e.g., an announcement) can be kept in the SN instead of in the users' handsets. As illustrated in FIG. 8, the procedure above can be modified as follows:

810. Party A dials the telephone number of party B.
820. The circuit voice call request is fielded by the MSC as per standard voice call flow procedures.
830. The voice call request triggers a TDP in the MSC, causing the MSC to send a pre-determined message, containing the calling and called numbers, to the SN.
840. SN receives the pre-determined message from the MSC, holds the return response to the MSC, and establishes a packet connection with party B's handset.
850. SN transmits a multimedia object to the PA on party B's handset.
860. The PA on party B's handset receives and holds the multimedia object.
870. SN responds back to MSC "proceed with voice call."
880. The PA on party B's handset receives the circuit voice call indication.
890. The PA on party B's handset synchronizes the display/presentation of the multimedia object with the alert that party B is receiving a voice call from party A.

In some of the embodiments described herein, the packet connection is used exactly once.

Figure 9:
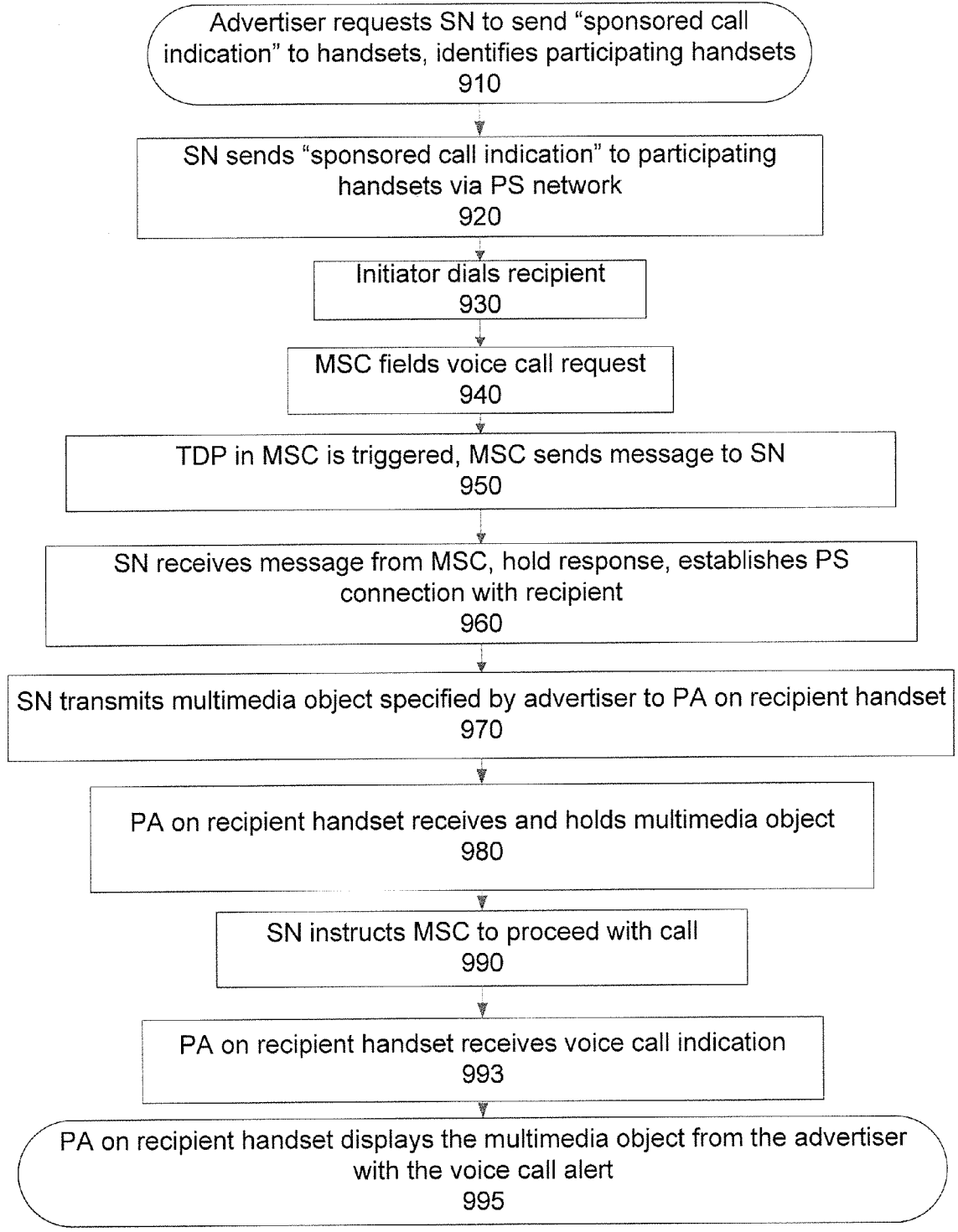
FIG. 9 illustrates an exemplary flowchart according to one embodiment of the invention.

As a further extension, a third party can use the packet connection to send a multimedia object to the calling and/or called parties. For example, consider a case where party C (hereafter referred to as "advertiser") wishes to "sponsor" or "subsidize" a telephone call between parties A and B. In order to make parties A and B aware of this facility, the advertiser can send an indication to all of the handsets that are included in his advertising campaign. Upon receiving the indication, party A or party B initiates the call. One example of a procedure to effectuate this process, illustrated in FIG. 9, is as follows:

910. Advertiser requests the SN to send a "sponsored call indication" to handsets participating in the campaign. The SN can identify participating handsets with an out-of-band process which asks users to "opt-in" to the campaign (or a group of campaigns), and identifies participating handsets when they register during power-on. Party A and party B are part of the campaign.
920. SN sends the "sponsored call indication" to participating handsets using the underlying packet network.
930. Subsequently, party A dials the telephone number of party B.
940. The MSC fields the circuit voice call request as per standard voice call flow procedures.
950. The voice call request triggers a TDP in the MSC, causing the MSC to send a pre-determined message, containing the calling and called numbers, to the SN.
960. SN receives the pre-determined message, holds the return response to the MSC, and establishes a packet connection with party B.
970. SN transmits the multimedia object specified by the advertiser to party B via the packet connection.
980. The PA in party B's handset receives and holds the multimedia object.
990. SN responds back to MSC "proceed with voice call."
993. The PA in party B's handset receives a circuit voice call indication.
995. The PA in party B's handset synchronizes the multimedia object from the advertiser with "voice call indication" from party A and renders both on part B's handset.

The above procedure can be further streamlined and the time delay reduced by sending a priori the multimedia object, or a group of objects, to participating handsets, which then store the object(s). Then, the SN needs only to send the identifying tag of the stored object to the handset during the call. Objects that are sent a priori to participating handsets correspond to "ongoing campaigns" from advertisers, and may be refreshed as the requirements and durations of campaigns change over time.

Figure 10:
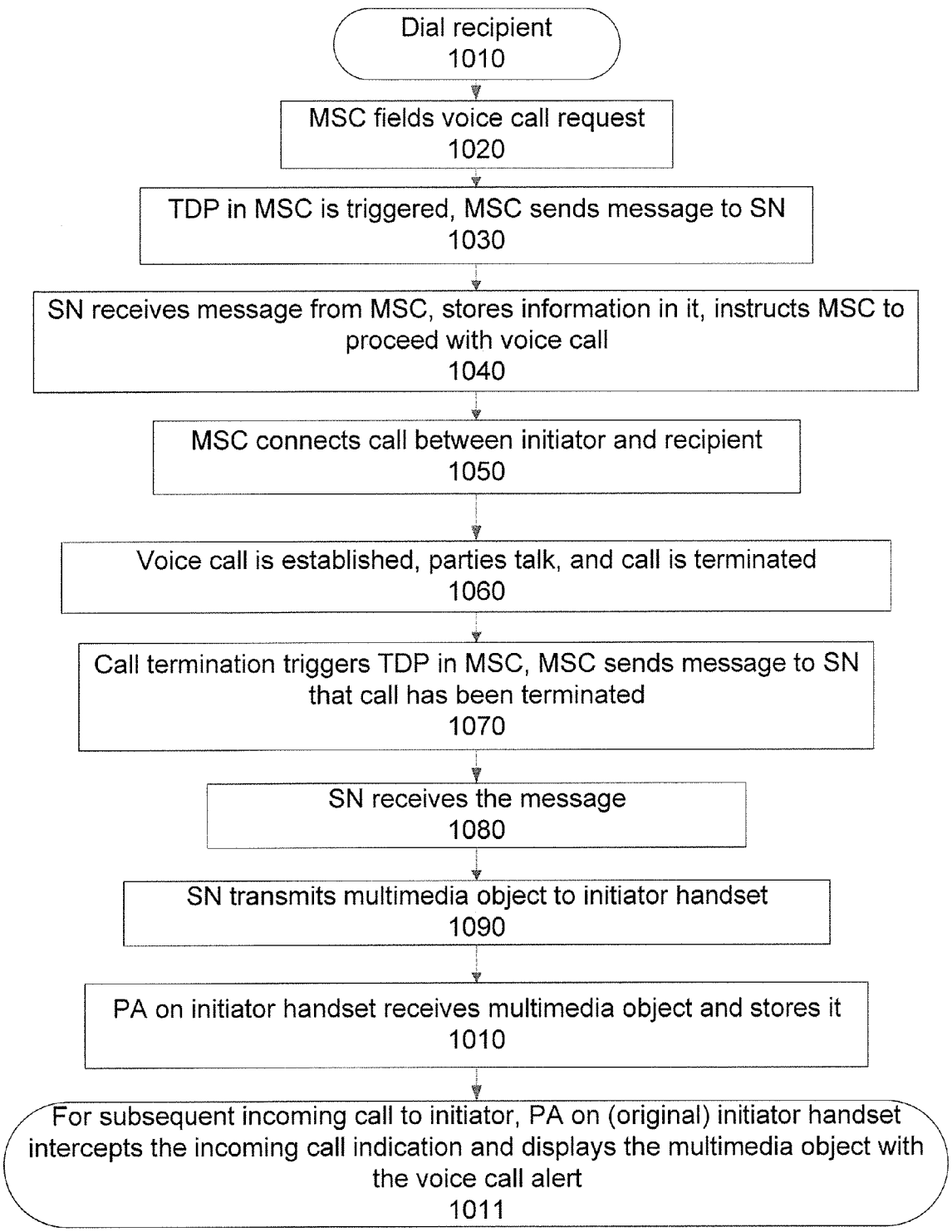
FIG. 10 illustrates an exemplary flowchart according to one embodiment of the invention.

In another example, the third party sends the multimedia object to the handset of the calling party (i.e., the initiator), but not of the called party (i.e., the recipient), after the current call is terminated. The handset renders the object for a subsequent (possibly, next) incoming call to the original calling party. This example, illustrated in FIG. 10, can be done as follows:

1010. Part A dials the telephone number of party B.
1020. The MSC fields the circuit voice call as per standard call flow procedures.
1030. The voice call request triggers a TDP in the MSC, causing the MSC to send a pre-determined message, containing the calling and called numbers, to the SN.
1040. SN receives the pre-determined message, stores the information in it, and responds back to MSC "proceed with voice call."
1050. MSC connects call between parties A and B as per standard call flow procedures.
1060. Call is established between parties A and B; parties talk and subsequently terminate call.
1070. The call termination triggers a TDP in the MSC, causing the MSC to send a message to SN that the call has been terminated.
1080. SN receives the message.
1090. SN transmits a multimedia object to party A's handset.
1010. The PA in party A's handset receives the multimedia object and stores it in the handset's memory.
1011. For a subsequent incoming call to party A (including, but not limited to the next call party A receives after receiving the multimedia object), the PA in party A's handset intercepts the incoming call indication and synchronizes the rendering of the multimedia object with the incoming voice call indication.

It should be further observed that steps 1070 and 1080 of the above example are optional; in particular, the MSC need not inform the SN of call termination. Rather, the SN may introduce a delay in its service logic and then attempt to transmit the multimedia object to party A, and repeat the attempt at periodic intervals until successful. In radio access networks such as UMTS, which support multiple radio access bearers, the multimedia object can be sent to a user in parallel with an ongoing circuit-switched voice call. It will be appreciated that the multimedia object can be sent to only the calling party, to only the called party, or to both.

Uses of Image Ring and Video Ring

As another example of an application of the Image Ring service, consider a case in which party A wishes to place a voice call to party B, and to transmit an image (e.g., a photograph) as part of "call alerting." It is expected that party B will receive the call alert (indicated by "ringing") and the image synchronously, e.g., party B may use the image to identify the calling party. The image in question may have been pre-selected by party A from a collection of images residing on party A's handset for use in future calls, or future calls to a particular subscriber; the image may also be chosen and pre-selected from a gallery of such objects resident in the network or portal of a service provider. In order to transmit the image to party B, party A's handset needs to establish a connection to party B's handset using the PS connection, negotiate resources and capabilities, and transmit or otherwise cause the image to be transmitted to called party B, ensuring that the voice call indication which uses the CS connection, arrives contemporaneously with the rendering of the transmitted image.

As an example of another embodiment of the Image Ring service, consider a case in which party A wishes to place a voice call to party B, and to transmit a multimedia object (e.g., calling card information) to party B at the end of the voice call.

As an example of Video Ring service, consider a case in which the calling party wishes the called party to view a video clip as a part of the "call alert." The video clip will be transmitted to the called party handset using the PS connection. The voice call alert uses the CS connection. As for the Image Ring service, the video clip can be rendered contemporaneously with the voice call alert.

It will be appreciated that the multimedia object can also be displayed during the voice call, after the voice call, as a call alert for a subsequent call, or even during, or after a subsequent call.

Selection of the Multimedia Object

The association between a recipient and the multimedia object that is rendered for the recipient will now be explained in more detail. As is well known in mobile advertising models, the advertisements are generally targeted to the recipient based on known or profile information of the recipient. Generally such information lies outside the scope of the SN; rather it is assumed that an external entity stores and formulates this information. This information is then conveyed to the SN. Such information may have a logical form as a table consisting of rows with two columns. Each row represents a single recipient identified by a telephone number, i.e., the first column of the table is a telephone number. The second column contains the serial number of advertisements that may be rendered for the associated telephone. Related to such a table is a database of advertisements indexed by serial numbers. All this information may be made available to the SN. Upon receiving a trigger from the CS network of an impending call in a UMTS network destined for a particular receiving mobile handset identified by a telephone umber, the SN may look up the telephone number in the association table, retrieve the serial number of the advertisement(s) to be shown to this recipient, then retrieve the corresponding advertisement from the database, and cause it to be transported to the handset. In non-UMTS networks where mRAB technology is not available, or in those networks where pre-loading of advertisements has been chosen, the SN may retrieve the advertisement from the database for a particular handset and cause it to be pre-loaded in the handset. In those cases where the association table specifies multiple advertisements for a single telephone number, a scheduling algorithm such as round-robin may be used either by the SN or the PA. A person skilled in the art will be able to adapt these techniques to associate the multimedia object with the initiator profile.

Systems for Coordinating CS and PS connections

One system that can facilitate coordination between the CS and PS networks is the Service Delivery Platform (SDP), described in detail in U.S. Patent Pub. No. 2007/0197227, filed Oct. 16, 2006, and entitled "System and method for enabling combinational services in wireless networks by using a service delivery platform," the entire contents of which are incorporated herein by reference. Descriptions of other systems and/or components may be found in the incorporated patent references, given below. Briefly, the SDP includes a Serving Node (SN) that may communicate with both the CS voice network and the packet-switched network (with or without IMS). The SDP also includes a Personal Agent (PA), which is a piece of service logic that resides in the handset(s). The PA and the SN can send messages to each other, e.g., regarding services the user would like to use, the local network environment of the handset, or instructions the SN would like the PA to execute on the handset. The SN receives information from the CS network (called "triggers") about ongoing call events. It also has the capability to receive information and data from elements connected to the PS network. Examples of such data received by the SN from elements connected to the PS network are images (e.g., photographs), advertisements, video clips, and other multimedia objects. Examples of information received by the SN from elements connected to the PS network include, but are not limited to: what multimedia object to render and when; whether to associate presentation of the multimedia object with a specific telephone number or a specific time of the day; event information from IMS services, and the like.

Systems and Methods for Image and Video Ring in UMTS/WCDMA Networks

Figure 6:
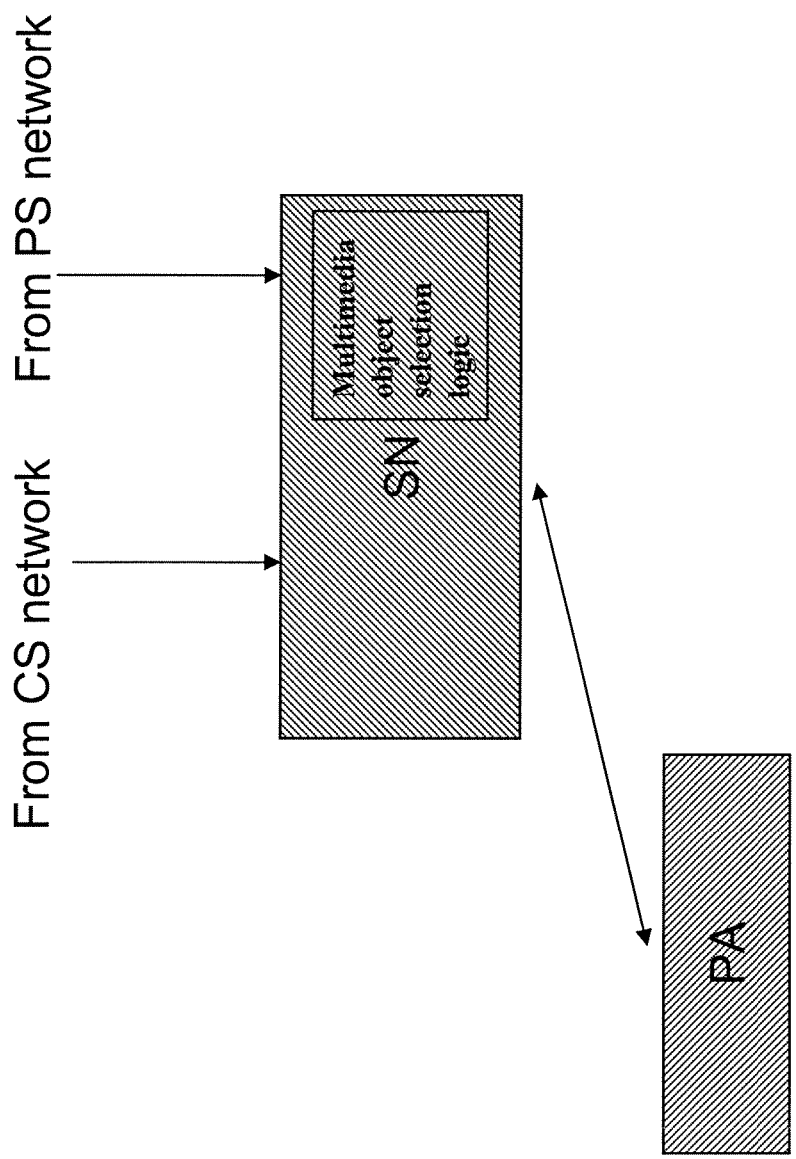
FIG. 6 illustrates the interaction of the serving node (SN) with the circuit-switched (CS) network, the packet-switched (PS) network, and a personal agent (PA) on the recipient handset.

In UMTS/WCDMA networks, since multiple Radio Access Bearers are possible, and the SN can contact the PA while the handset may be engaged in interactions with the CS network. In this case we assume the voice call is to be carried by the CS network, the multimedia object to be rendered is carried by the PS network and/or pre-stored (as a result of an out of band process) in a storage area controlled by the SN, and the modulation technology being used by the Radio Access Network (RAN) is WCDMA/UMTS. We shall assume that the service being implemented is to render a selected multimedia object as a part of the call alerting phase of an incoming call to a receiving handset. The implementation of this service is as follows. Party A dials telephone number of party B. The signaling for this call is carried to the originating MSC from where it is routed to the terminating MSC and onwards to the receiving handset. During this routing phase, one or more triggers are generated by elements in the CS network and transmitted to the SN where they are received by the interface shown in the FIG. 6 (SN). We shall describe the generation of these triggers in more detail later. The triggers serve to inform the SN of the progress ("state of the call") of the voice call. The SN uses this state information to coordinate the delivery of the multimedia object to the receiving handset. In UMTS/WCDMA networks, since multiple Radio Access Bearers are possible, the SN can contact the PA while the handset may be engaged in interactions with the CS network. Because multiple Radio Access Bearers are possible, the SN can contact the PA while the handset is engaged in interactions with the CS network. Thus, when a trigger is received from the CS network by SN indicating that a voice call has been initiated (but that the voice bearer has not started yet) the SN may initiate and send a selected multimedia object to the PA running in the handset. The SN may optionally respond to the trigger received from the CS network element or the CS network may simply wait for a pre-determined amount of time before carrying on with actions dictated by its logic. The PA renders the received object on the handset. The criteria for selecting the object to be rendered may be pre-stored in the SN (having received it from the PS network elements in an out of band process) or may be dynamically received or created by logic resident inside SN. As will be clear to skilled practitioners, triggers from the CS network can also be used to indicate termination of a voice call and "voice call in progress." This triggering information can be used to coordinate the rendering of multimedia objects in handsets with the receiving of incoming calls to a fine granularity.

In some embodiments, the methods involve the procedures outlined below:

Procedure 1.0 [Sequential]:
1. Transmit the image from A's handset to B's handset using the PS connection first. Assume this takes "t1" seconds of time.
2. Once the transmitted image has been received, initiate the voice call setup request from A to B. Assume this takes "t2" seconds.
3. Intercept the voice call request arriving at B's handset and initiate rendering of previously received image contemporaneously with the call alert.

It should be noted that the time "t1" of step 1 above includes the uplink and downlink time. Uplink time refers to the process of using the RAN to upload the object from A's handset, using the RAN, to the core network. Downlink time refers to the process of downloading the object from the core network to B's handset using the RAN. Typically, uplink capacities are considerably less than downlink capacities. Thus the total setup delay for Image Ring, i.e., the combined set of actions above, is t1+t2 in which "t2" is, as indicated above, the normal voice call setup time. Moreover, the interval "t1" precedes "t2," so the extra time factor of "t1" is added to the voice call setup delay time. Thus, subscribers to some embodiments of Image Ring will typically experience longer call setup times for Image Ring calls than normal voice calls. A method that overlaps the actions in "t1" with actions in "t2" would shorten the total setup delay.

One system that can facilitate this interaction is the Service Delivery Platform (SDP), described above.

In some embodiments, the SN is used to modify the above-described procedure as follows:

Procedure 1.1 [SN]:
1. Subscriber "A" selects an image or video clip to be used for Image/Video Ring for a particular or a group of subscribers from a collection of such objects stored in the handset.
2. Subscriber A dials a voice call to subscriber B as per standard mobile phone technology, e.g., by using the keypad or using the contact list of the handset, etc.
3. The PA logic resident on A's handset intercepts the voice call request before it is sent out over the RAN. (In this case we shall say that the handset is being used as the synchronization point.)
4. The PA logic sends a trigger to the SN using the PS network connection containing information that uniquely identifies the image/video clip selected in step 1 above and identifies subscriber B, e.g., SIP URL of subscriber B.
5. The SN receives the trigger and initiates uploading and subsequent downloading of the selected object to the handset of subscriber B.
6. When the download is complete SN informs the PA of handset A which releases the voice call that had been intercepted.
7. The voice call indication from A reaches B's handset using CS network connection; PA logic resident in B's handset intercepts the voice call indication and renders the previously received object contemporaneously with the voice call alert.

In terms of delay analysis Procedure 1.1 uses steps that are similar to Procedure 1.0. In particular Procedure 1.1 uploads the selected object to SN and then SN downloads selected object to handset B, which is similar to the step carried out in Procedure 1.0. Thus, the difference in call setup delay between Procedure 1.0 and Procedure 1.1 may not be significant.

Step 1 of Procedure 1.1 can be modified to shorten the time t1 as follows. We allow the multimedia objects that are to be used as a part of voice call indicators, i.e., the images and video clips, to be stored in SN or in a portal or gallery. Subscribers can select objects, which are then uploaded to SN before initiating voice calls (i.e., in an "out of band" process). Thus, an association is created between the multimedia objects and the individual subscriber's contact list and this association is stored in the subscriber's handset (accessible to the PA logic). This association has the following logical format for illustrative purposes:

Contact John, Image #123
Contact Susan, Image #345
Contact Harry, Videoclip 654.

The names "John", "Susan" etc are mnemonics for phone numbers or URLs of individual subscribers and the Image numbers such as "123" uniquely identify the object to SN. Thus the association is a table that is maintained in the user's handset memory and is available to the PA logic. This table can be used in the following exemplary procedure:

Procedure 1.2 [Assoc].
1. Subscriber A dials a voice call to subscriber B as per standard mobile phone technology, e.g., by using the keypad or using the contact list of the handset, etc.
2. The PA logic resident on A's handset intercepts the voice call request before it is sent out over the RAN. (Again, we say that the handset is being used as the synchronization point.)
3. The PA logic consults the association list stored in A's handset and sends a trigger to the SN using the PS network connection containing information that uniquely identifies the image/video clip selected in step 1 above and the subscriber B, e.g., SIP URL of subscriber B.
4. The SN receives the trigger and initiates downloading of the selected object to the handset of subscriber B.
5. When the download is complete SN informs the PA of handset A, which releases the voice call that had been intercepted.
6. The voice call indication from A reaches B's handset using CS network connection; PA logic resident in B's handset intercepts the voice call indication and renders the previously received object contemporaneously with the voice call alert.

It should be noted that in Procedure 1.2 we do not upload the selected object to SN contemporaneously with the call request; rather the selected object already exists on the SN, and the calling party transmits information identifying the object to the SN with the call request. The SN then downloads the selected object to the terminating (called party) handset. This identifying information will in general be considerable smaller than the actual object. Since the uplink capacity in the RAN is typically much smaller than the downlink capacity, Procedure 1.2 will have considerably less call setup delay as compared to Procedure 1.1.

In another embodiment, the SN uses a Guard Ring Timer (GRT) to exploit the parallelism inherent in UMTS/WCDMA networks which allow simultaneous CS and PS network connections. Such an embodiment is illustrated below:
Procedure 1.3 [GuardTimer]:
1. Subscriber A dials a voice call to subscriber B as per standard mobile phone technology, e.g., by using the keypad or using the contact list of the handset, etc.
2. The PA logic resident on A's handset intercepts the voice call request before it is sent out over the RAN. (Again, we say that the handset is being used as the synchronization point.)
3. The PA logic consults the association list stored in A's handset and sends a trigger to the SN using the PS network connection containing information that uniquely identifies the image/video clip selected in step 1 above and the subscriber B, e.g., SIP URL of subscriber B.
4. The SN receives the trigger and initiates a timer called the Guard Ring Timer.
5. SN initiates downloading of the selected object to the handset of subscriber B.
6. When the Guard Ring Timer expires SN informs the PA of handset A which releases the voice call that had been intercepted.
7. The voice call indication from A reaches B's handset using CS network connection; PA logic resident in B's handset intercepts the voice call indication and renders the previously received object contemporaneously with the voice call alert.

In this embodiment, the SN need not wait until the downloading of the selected object to the called party handset is complete; rather the SN can anticipate such a completion, and inform the calling party handset to release the intercepted call before the downloading of the selected object is complete. This is accomplished by setting the GRT interval appropriately. In other words the delay analysis described in Procedure 1.0 [Sequential] in which "t1" preceded "t2" is modified by the introduction of GRT which allows the interleaving of t1 and t2, thus no longer requiring t1 and t2 to be sequential. Thus the call set up delay in Procedure 1.3 [GuardTimer] is expected to be shorter than the other procedures described above.

Systems and Methods for Image and Video Ring in Edge/GSM/GPRS Networks

In this section we consider wireless networks that do not allow simultaneous CS and PS connections. Examples of such networks include GSM, GPRS, and some implementations of CDMA networks in which different radio frequencies are used for CS and PS network connections and, hence, which do not support simultaneous CS and PS connections since the handsets are single frequency. In such networks only one of the CS or PS connections can be active at a time. Some networks may even have a built in bias to support CS connections as a priority over PS connections; in such cases an incoming CS call will cause the handset to hold the PS connection in abeyance to the CS connection.

Logic resident in the SN is aware of the radio technology under which it is deployed. Alternatively, PA logic can test the prevailing radio access network and communicate said information to SN to set the proper parameters in SN's logic. In Edge/GPRS networks SN logic pre-loads one or more multimedia objects to be rendered in a participating handset at a suitable time, i.e., when the handset is not in communication with the CS network. Now if a participating handset receives a voice call alert, said alert is intercepted by PA logic before it is received by other (normal call) logic in the handset. Logic in the PA then decides when to render the multimedia object (before, during, after) the incoming call.

Some embodiments use the GRT described above, by appropriately selecting its value. In UMTS/WCDMA networks that allow a handset to receive information on both PS and CS simultaneously, the value of the GRT can be set in such a manner as to allow enhance parallelism between the CS and PS streams. However, in EDGE/GPRS/CDMA networks that do not allow parallelism between the CS and PS connections, the GRT can be set to a value that prohibits such parallelism, instead allowing a sequential transfer of PS followed by a transfer on the CS connection. Thus the value used for the GRT can be tuned for either kind of network and Procedure 1.3 can be used for either type of network. Thus, the tunable GRT values provide a flexible way to use the same basic embodiments of Image Ring and/or Video Ring on a variety of networks without the need for significant modification. In this embodiment, no coordination between the CS network and the PS network is required.

Other Embodiments

In another embodiment the voice call may be carried by the PS network and not by the CS network, e.g., VoIP call. In such cases, the triggers indicating call state progress to the SN may be generated by elements in the PS network such as Media Gateway Control Function, VoIP switch, Call State Control Functions (CSCF), or other IMS network elements.

Generation of Triggers

In the description above, we have assumed that the CS network can generate triggers indicating call state information to the SN. These triggers can be generated by programming the Trigger Detection Points (TDP) resident as logic in the MSC switches. In particular, an as exemplary embodiment, TDP #2 can be used at Originating MSC switch to indicate a call originating event. Call termination triggers may also be generated by TDP at Terminating MSC switches. In another embodiment, TDP from originating and Terminating MSCs may be used to achieve finer granularity coordination between the voice call and the rendering of multimedia objects.

In one embodiment, which uses a Synchronization Point (SP), the Synchronization Point (SP) is moved from the originating handset to the SCF (Service Control Function) in the CS core network. In this embodiment, a voice call originated by the originating handset proceeds to the MSC wherein a TDP is invoked by the MSC service logic (pre-provisioned by the operator), e.g., IDP #2, which is then transmitted to the SCF as practiced by standard MSC logic and described herein earlier. In this embodiment the SN (described above) acts as the SCF and receives the TDP. It then initiates the GRT of procedure 1.3 above for a suitable pre-determined period of time. Thus, in this embodiment, the voice call is "held" at the SN (acting as a SCF), allowing synchronization of the voice call part of the Image Ring with the transmission of the selected multimedia object on the PS connection. Hence, the SN acting as the SCF acts as a Synchronization Point (SP). The usefulness of this embodiment is that it allows a greater degree of synchronization between the CS and PS segments by using more of the normal voice call setup delay to transmit the selected multimedia object.

Another embodiment uses two Synchronization Points (SP) as follows. The SN acts as a SCF to not only the originating MSC but also the Terminating MSC for a CS voice call. The SN acting as a SCF receives TDP triggers from both MSCs and uses the GRT more efficaciously to provide a higher degree of synchronization or parallelism between the CS and PS segments of Image/Video Ring. In this embodiment, the transmission of the multimedia object is started by the SN when the TDP is received from the originating MSC, the voice call is released and proceeds to the terminating MSC navigating its way through the MSC network. When it reaches the terminating MSC, a TDP is triggered and received by the SN, which "holds" the call until the GRT has expired. This "dual SP" embodiment allows further parallelism by using a part of the time spent in traversing the MSC network for delivering the selected multimedia object. In another embodiment, the selected object an advertisement.

In some embodiments the multimedia object (e.g., advertisement) to be rendered is selected by a third party, different from the caller or called parties, while in other embodiments the caller or called party selects the advertisement. SN service logic determines and associates the advertisement that is to be selected for a given voice call and transmits the selected multimedia object to the called party as described above. This association may be dependent on time of day, calling or called party identification which may be received by the SN via the TDP from the CS network or from the PS network, or logic residing in the originating handset or pre-provisioned in the SN by a third party, or other third party determined targeting criteria.

Embodiments of the present invention build on techniques, systems and methods disclosed in earlier filed applications, referred to herein as the "incorporated patent references," including but not limited to the following references, the entire contents of which are incorporated herein by reference: U.S. patent application Ser. No. 11/709,469, filed Feb. 22, 2007, entitled System and Methods for IP Signaling in Wireless Networks; U.S. Patent Pub. No. 2007/0197227, entitled System and Method for Enabling Combinational Services in Wireless Networks By Using a Service Delivery Platform; U.S. Patent Pub. No. 2006/0291437, entitled System and Method to Provide Dynamic Call Models for Users in an IMS Network; U.S. Patent Pub. No. 2006/0291412, entitled Associated Device Discovery in IMS Networks; U.S. Patent Pub. No. 2006/0291487, entitled IMS Networks with A VS Sessions with Multiple Access Networks; and U.S. Patent Pub. No. 2006/0291488, entitled System and Method of Interworking Non-IMS and IMS Networks to Create New Services Utilizing Both Networks.

It will be further appreciated that the scope of the present invention is not limited to the above-described embodiments, but rather is defined by the appended claims, and that these claims will encompass modifications of and improvements to what has been described.

What is claimed is:

1. A method for a Serving Node (SN) to facilitate a first user endpoint (UE) using combinational services involving a packet switched (PS) network, for sending a multimedia object to a second UE immediately before the start of a voice call on a circuit switched (CS) network between the first UE and the second UE, the method comprising:
   receiving a first message from the first UE to initiate a voice call to a second UE on the CS network;
   receiving a multimedia object from personal agent (PA) logic stored in memory in the first UE;
   based on service logic stored in memory in the SN, computing a time interval to delay the voice call in order to allow the multimedia object to be delivered to the second UE and rendered by the second UE prior to the start of the voice call;
   delivering the multimedia object to the second UE through the PS network; and
   allowing the voice call to proceed on the CS network after the computed time interval has expired,
   wherein the SN provides a connection between the first UE and only one of the CS network and PS network at any given time.

2. The method of claim 1, wherein the multimedia object is selected from the group consisting of a multimedia object from the first UE, an object from an external third-party server, a re-ordering and re-prioritizing a previously stored object stored at the SN, or user profile data.

3. The method of claim 1, wherein Personal Agent (P A) logic stored in memory in the second UE coordinates rendering of the received multimedia object with a voice call alert.

4. The method of claim 1, wherein the multimedia object sent to the SN by the first UE was initially stored in the first UE.

5. The method of claim 1, wherein the multimedia object comprises a multimedia object sent to the SN by an external third-party server, is stored on the third-party server and chosen in response to information received from the SN, or business rules internal to the third-party server.

6. The method of claim 1, wherein the SN pre-loads a plurality of objects into the second UE, or causes a plurality of objects to be pre-loaded into the second UE from an external third-party server.

7. The method of claim 6, wherein a second message from the SN to the second UE causes the selection of the multimedia object from the pre-loaded list of objects stored on the second UE, or causes the pre-loaded list of objects to be re-ordered and re-prioritized.

8. The method of claim 7, wherein Personal Agent (P A) logic stored in memory in the second UE coordinates the rendering of the selected object with an incoming call alert.

9. The method of claim 1, wherein the multimedia object comprises an advertisement, a video clip, or an image.

10. A Serving Node (SN) in a network for facilitating a first user endpoint (UE) using combinational services involving a packet switched (PS) network to send a multimedia object to a second UE immediately before the start of a voice call on a circuit switched (CS) network between the first UE and the second UE, the SN comprising:
    logic stored in memory configured to:
    receive a first message from the first UE to initiate a voice call to a second UE on the CS network;
    receive a multimedia object from personal agent (PA) logic stored in memory in the first UE;
    based on service logic stored in memory in the SN, compute a time interval to delay the voice call in order to allow the multimedia object to be delivered to the second UE and rendered by the second UE prior to the start of the voice call;
    deliver the multimedia object to the second UE through the PS network; and
    allow the voice call to proceed on the CS network after the computed time interval has expired,
    wherein the SN provides a connection between the first UE and only one of the CS network and PS network at any given time.

11. The SN of claim 10, wherein the multimedia object is selected from the group consisting of a multimedia object from the first UE, an object from an external third-party server, a re-ordering and re-prioritizing previously stored object stored at the SN, or user profile data.

12. The SN of claim 10, wherein Personal Agent (P A) logic stored in memory in the second UE coordinates rendering of the received multimedia object with a voice call alert.

13. The SN of claim 10, wherein the multimedia object sent to the SN by the first UE was initially stored in the first UE.

14. The SN of claim 10, wherein the multimedia object comprises a multimedia object sent to the SN by an external third-party server, is stored on the third-party server and chosen in response to information received from the SN, or business rules internal to the third-party server.

15. The SN of claim 10, wherein the SN pre-loads a plurality of objects into the second UE, or causes a plurality of objects to be pre-loaded into the second UE from an external third-party server.

16. The SN of claim 15, wherein a second message from the SN to the second UE causes the selection of the multimedia object from the pre-loaded list of objects stored on the second UE, or causes the pre-loaded list of objects to be re-ordered and reprioritized.

17. The SN of claim 16, wherein Personal Agent (PA) logic stored in memory in the second UE coordinates the rendering of the selected object with an incoming call alert.

18. The SN of claim 10, wherein the multimedia object comprises an advertisement, a video clip, or an image.

19. A method for first user endpoint (UE) using combinational services involving a packet switched (PS) network, to send a multimedia object to a second UE immediately before the start of a voice call on a CS network between the first UE and the second UE, the method comprising:
transmitting a first message to a serving node (SN) to initiate a voice call on a CS network with the second UE;
transmitting a multimedia object to the SN;
receiving a computed time interval from the SN to delay the voice call in order to allow the multimedia object to be delivered to the second UE and rendered by the second UE prior to the start of the voice call;
delivering the multimedia object to the second UE through the PS network; and
starting the voice call to proceed with the second UE after the computed time interval has expired;
wherein the first UE has a connection with only one of the CS or PS network at any given time.

20. The method of claim 19, wherein the multimedia object is selected from the group consisting of a multimedia object stored on the first UE, an object from an external third-party server, a re-ordering and re-prioritizing previously stored object stored at the SN, or user profile data.

21. The method of claim 19, wherein Personal Agent (PA) logic stored in memory in the second UE coordinates rendering of the received multimedia object with a voice call alert.

22. The method of claim 19, wherein the multimedia object sent to the SN by the first UE was initially stored in the first UE.

23. The method of claim 19, wherein the multimedia object comprises a multimedia object send to the first UE by an external third-party server, is stored on the third-party server and chosen in response to information received from the SN, or business rules internal to the third-party server.

24. The method of claim 19, wherein Personal Agent (PA) logic stored in memory in the second UE coordinates the rendering of the selected object with an incoming call alert.

25. The method of claim 19, wherein the multimedia object comprises an advertisement, a video clip, or an image.

26. A method of delaying the start of a voice call between a first user endpoint (UE) and a second UE to deliver a multimedia object to the second UE prior to the start of the voice call on the second UE, the method comprising:
providing a serving node (SN) with connections to both a circuit switched (CS) network and a packet switched (PS)-network;
the SN receiving a first message from the first UE to initiate a voice call to a second UE;
the SN receiving a multimedia object from personal agent (P A) logic stored in memory in the first UE;
based on service logic stored in memory in the SN, the SN computing a time interval to delay the voice call in order to allow the multimedia object to be delivered to the second UE and rendered by the second UE prior to the start of the voice call;
the SN initiating a packet session in the PS network;
the SN delivering the multimedia object to the second UE through the packet session on the PS network; and
the SN allowing the voice call to proceed on the PS network after the computed time interval has expired,
wherein the SN provides a connection between the first UE and only one of the CS network and PS network at any given time.

27. The method of claim 26, wherein the SN receives a first message from the first UE to initiate a voice call to a second UE on the CS network.

28. The method of claim 26, further comprising the SN migrating the voice call from the CS network to the packet session in the PS network.

29. The method of claim 26, wherein the multimedia object is selected from the group consisting of a multimedia object from the first UE, an object from an external third-party server, a re-ordering and re-prioritizing a previously stored object stored at the SN, or user profile data.

\* \* \* \* \*